US012647979B2

(12) United States Patent (10) Patent No.: US 12,647,979 B2
Park et al. (45) Date of Patent: Jun. 2, 2026

(54) METHOD BY WHICH TERMINAL TRANSMITS FEEDBACK SIGNAL IN WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Suckchel Yang, Seoul (KR); Kijun Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 390 days.

(21) Appl. No.: 18/261,647

(22) PCT Filed: Jan. 17, 2022

(86) PCT No.: PCT/KR2022/000830
§ 371 (c)(1),
(2) Date: Jul. 14, 2023

(87) PCT Pub. No.: WO2022/154624
PCT Pub. Date: Jul. 21, 2022

(65) Prior Publication Data
US 2024/0314779 A1 Sep. 19, 2024

(30) Foreign Application Priority Data
Jan. 15, 2021 (KR) ........................ 10-2021-0006331

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/11* (2023.01); *H04W 72/21* (2023.01)

(58) Field of Classification Search
CPC . H04W 72/1273; H04W 72/21; H04W 72/11; H04W 84/06; H04L 1/1896; H04L 1/1854; H04L 1/1812; H04L 1/1822
See application file for complete search history.

(56) References Cited

U.S. PATENT DOCUMENTS

2022/0061074 A1* 2/2022 Babaei ................. H04L 5/0053
2022/0239417 A1* 7/2022 Cheng .................. H04L 1/1835
(Continued)

FOREIGN PATENT DOCUMENTS

| KR | 10-2014-0134211 | 11/2014 |
| WO | 2020-096438 | 5/2020 |
| WO | 2020-197195 | 10/2020 |

OTHER PUBLICATIONS

European Patent Office Application Serial No. 22739816.1, Search Report dated Dec. 2, 2024, 6 pages.
(Continued)

*Primary Examiner* — Brian D Nguyen
(74) *Attorney, Agent, or Firm* — LEE, HONG, DEGERMAN, KANG & WAIMEY

(57) ABSTRACT

Disclosed are a method by which a terminal transmits a feedback signal in a wireless communication system, and an apparatus therefor, according to various embodiments. Disclosed are the method and an apparatus therefor, the method comprising the steps of: receiving a first signal for scheduling a physical downlink shared channel (PDSCH); and determining whether or not to transmit the feedback signal related to the first signal, wherein, on the basis of the first signal including control information regarding activation or release of a semi-persistent scheduling (SPS) PDSCH, the (Continued)

feedback signal is transmitted regardless of whether or not a hybrid automatic repeat and request (HARQ) process for the PDSCH is disabled.

7 Claims, 18 Drawing Sheets

(51) Int. Cl.
    *H04W 72/11*     (2023.01)
    *H04W 72/21*     (2023.01)

(56)         References Cited

U.S. PATENT DOCUMENTS

| | | | | |
|---|---|---|---|---|
| 2022/0240283 | A1* | 7/2022 | Hong | H04L 1/1896 |
| 2023/0261840 | A1* | 8/2023 | Wong | H04L 1/1812 370/329 |
| 2023/0319842 | A1* | 10/2023 | Nogami | H04W 72/12 370/329 |
| 2023/0379097 | A1* | 11/2023 | Wu | H04L 1/1854 |
| 2023/0379966 | A1* | 11/2023 | Nogami | H04W 72/231 |
| 2023/0397196 | A1* | 12/2023 | Nishio | H04L 5/0094 |
| 2024/0032012 | A1* | 1/2024 | Wang | H04W 4/06 |

OTHER PUBLICATIONS

ZTE, "Summary#3 of AI 8.4.3 for HARQ for NTN," 3GPP TSG RAN WG1 Meeting #103e-E, R1-2009695, Nov. 2020, 45 pages.
PCT International Application No. PCT/KR2022/000830, International Search Report dated May 4, 2022, 14 pages.
Sony, "Enhancements on HARQ for NTN," R1-2008361, 3GPP TSG RAN WG1 Meeting #103-e, E-meeting, Nov. 2020, 8 pages.
Moderator (ZTE), "Summary of Al 8.4.3 for HARQ for NTN," R1-2009420, 3GPP TSG RAN WG1 #103e-E, e-Meeting, Nov. 2020, 33 pages.

* cited by examiner (a) Example of PDSCH time domain resource allocation (b) Example of PUSCH time domain resource allocation (a)

(b)

(a)

(b)

· Common TA (Tcom) = 2*D0/c
· UE specific differential TA for xth UE (TUEx) = 2*(D1x-D0)/c
· Full TA (Tfull) = Tcom+TUEx (a) Regenerative payload · Common TA (Tcom) = 2*(D01+D02)/c
· UE specific differential TA for xth UE (TUEx) = 2*(D1x-D01)/c
· Full TA (Tfull) = Tcom+TUEx (b) Transparent payload

METHOD BY WHICH TERMINAL TRANSMITS FEEDBACK SIGNAL IN WIRELESS COMMUNICATION SYSTEM, AND APPARATUS THEREFOR

CROSS-REFERENCE TO RELATED APPLICATION(S)

This application is the National Stage filing under 35 U.S.C. 371 of International Application No. PCT/KR2022/000830, filed on Jan. 17, 2022, which claims the benefit of earlier filing date and right of priority to Korean Application No. 10-2021-0006331, filed on Jan. 15, 2021, the contents of which are all incorporated by reference herein in their entirety.

TECHNICAL FIELD

The following description relates to a method of transmitting a feedback signal by a user equipment (UE) in a wireless communication system and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

DISCLOSURE

An object to be achieved is to provide a method and an apparatus therefor that resolve ambiguity between a UE and a base station (BS) regarding whether an indication of activation of a semi-persistent scheduling (SPS) PDSCH is received by ensuring that the UE will transmit a feedback signal for the indication of activation of the SPS PDSCH regardless of whether a HARQ process is disabled in an NTN communication situation in which there is a high possibility that HARQ-disabled will be configured.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

According to an aspect of the present disclosure, provided herein is a method of transmitting a feedback signal to a base station (BS) by a user equipment (UE) in a wireless communication system, including receiving a first signal for scheduling a physical downlink shared channel (PDSCH), and determining whether to transmit the feedback signal related to the first signal. The feedback signal may be transmitted regardless of whether a hybrid automatic repeat and request (HARQ) process for the PDSCH is disabled based on the first signal including control information about activation or release of a semi-persistent scheduling (SPS) PDSCH.

The feedback signal may be transmitted through a physical uplink control channel (PUCCH) resource based on a PUCCH resource indicator (PRI) field in the first signal based on the HARQ process being disabled.

The feedback signal may be an acknowledgement (ACK) signal for reception of the control information.

The method may further include receiving a configuration of a feedback resource for a disabled HARQ process through radio resource control (RRC) signaling. The feedback signal may be transmitted through the feedback resource.

A periodicity of a resource of the feedback signal may be longer than a periodicity of the SPS PDSCH activated by the first signal.

The method may further include receiving SPS configuration information. The UE may be configured only with an enabled HARQ process for the SPS PDSCH through the SPS configuration information.

The SPS configuration information may include a first HARQ process ID pool including enabled HARQ process identifications (IDs) and a second HARQ process ID pool including disabled HARQ process IDs.

The method may further include receiving at least one parameter for determining a HARQ process identification (ID) for the SPS PDSCH from the BS. The at least one parameter may have a value configured to always determine only an enabled HARQ process ID for the SPS PDSCH.

In another aspect of the present disclosure, provided herein is a method of receiving a feedback signal by a base station (BS) in a wireless communication system supporting a non-terrestrial network (NTN), including transmitting a first signal for scheduling a physical downlink shared channel (PDSCH) to a user equipment (UE) and receiving a feedback signal related to the first signal from the UE. The feedback signal may be received regardless of whether a hybrid automatic repeat and request (HARQ) process for the PDSCH is disabled based on the first signal including control information about activation or release of a semi-persistent scheduling (SPS) PDSCH.

The method may further include transmitting SPS configuration information to the UE. The SPS configuration information may configure only an enabled HARQ process for the SPS PDSCH.

The first signal may schedule the PDSCH related to a non-terrestrial network (NTN).

In another aspect of the present disclosure, provided herein is a user equipment (UE) for transmitting a feedback signal in a wireless communication system, including a radio frequency (RF) transceiver, and a processor connected to the RF transceiver. The processor controls the RF transceiver to receive a first signal for scheduling a physical downlink shared channel (PDSCH) and determines whether to transmit the feedback signal related to the first signal. The feedback signal may be transmitted regardless of whether a hybrid automatic repeat and request (HARQ) process for the PDSCH is disabled based on the first signal including control information about activation or release of a semi-persistent scheduling (SPS) PDSCH.

In another aspect of the present disclosure, provided herein is a base station (BS) for transmitting a feedback signal in a wireless communication system, including a radio frequency (RF) transceiver, and a processor connected to the RF transceiver. The processor controls the RF transceiver to transmit a first signal for scheduling a physical downlink shared channel (PDSCH) to a user equipment (UE) and receive the feedback signal related to the first signal from the UE. The feedback signal may be received regardless of whether a hybrid automatic repeat and request (HARQ) process for the PDSCH is disabled based on the first signal including control information about activation or release of a semi-persistent scheduling (SPS) PDSCH.

In another aspect of the present disclosure, provided herein is a chipset for transmitting a feedback signal in a wireless communication system, including at least one processor, and at least one memory operably connected to the at least one processor and causing, when executed, the at least one processor to perform operations. The operations may include receiving a first signal for scheduling a physical downlink shared channel (PDSCH) and determining whether to transmit the feedback signal related to the first signal. The feedback signal may be transmitted regardless of whether a hybrid automatic repeat and request (HARQ) process for the PDSCH is disabled based on the first signal including control information about activation or release of a semi-persistent scheduling (SPS) PDSCH.

In another aspect of the present disclosure, provided herein is a computer readable storage medium including at least one computer program that performs operations of transmitting a feedback signal in a wireless communication system. The at least one computer program may be configured to cause at least one processor to perform the operations of transmitting the feedback signal and may be stored in the computer readable storage medium. The operations may include receiving a first signal for scheduling a physical downlink shared channel (PDSCH) and determining whether to transmit the feedback signal related to the first signal. The feedback signal may be transmitted regardless of whether a hybrid automatic repeat and request (HARQ) process for the PDSCH is disabled based on the first signal including control information about activation or release of a semi-persistent scheduling (SPS) PDSCH.

Various embodiments may resolve ambiguity between a UE and a BS regarding whether an indication of activation of an SPS PDSCH is received by ensuring that the UE will transmit a feedback signal for the indication of activation of the SPS PDSCH regardless of whether a HARQ process is disabled in an NTN communication situation in which there is a high possibility that HARQ-disabled will be configured. Therefore, waste of a downlink resource and a buffer may be minimized.

Even when there is a high possibility that HARQ-disabled will be configured in an NTN communication situation, ambiguity related to reception of an indication of an SPS PDSCH indication may be effectively resolved by ensuring transmission of a feedback signal for release of the SPS PDSCH.

Alternatively, ambiguity described above may be resolved by ensuring that only an enabled HARQ process is configured for a procedure related to an SPS PDSCH in an NTN communication situation in which there is a high possibility that HARQ-disabled will be configured.

In addition, even for an SPS PDSCH for which HARQ-disabled is configured, ambiguity related to whether an indication of activation/release of the SPS PDSCH is received may be effectively resolved by ensuring transmission of a feedback signal using a resource configured through RRC.

Effects to be achieved by embodiment(s) are not limited to what has been particularly described hereinabove and other effects not mentioned herein will be more clearly understood by persons skilled in the art to which embodiment(s) pertain from the following detailed description.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
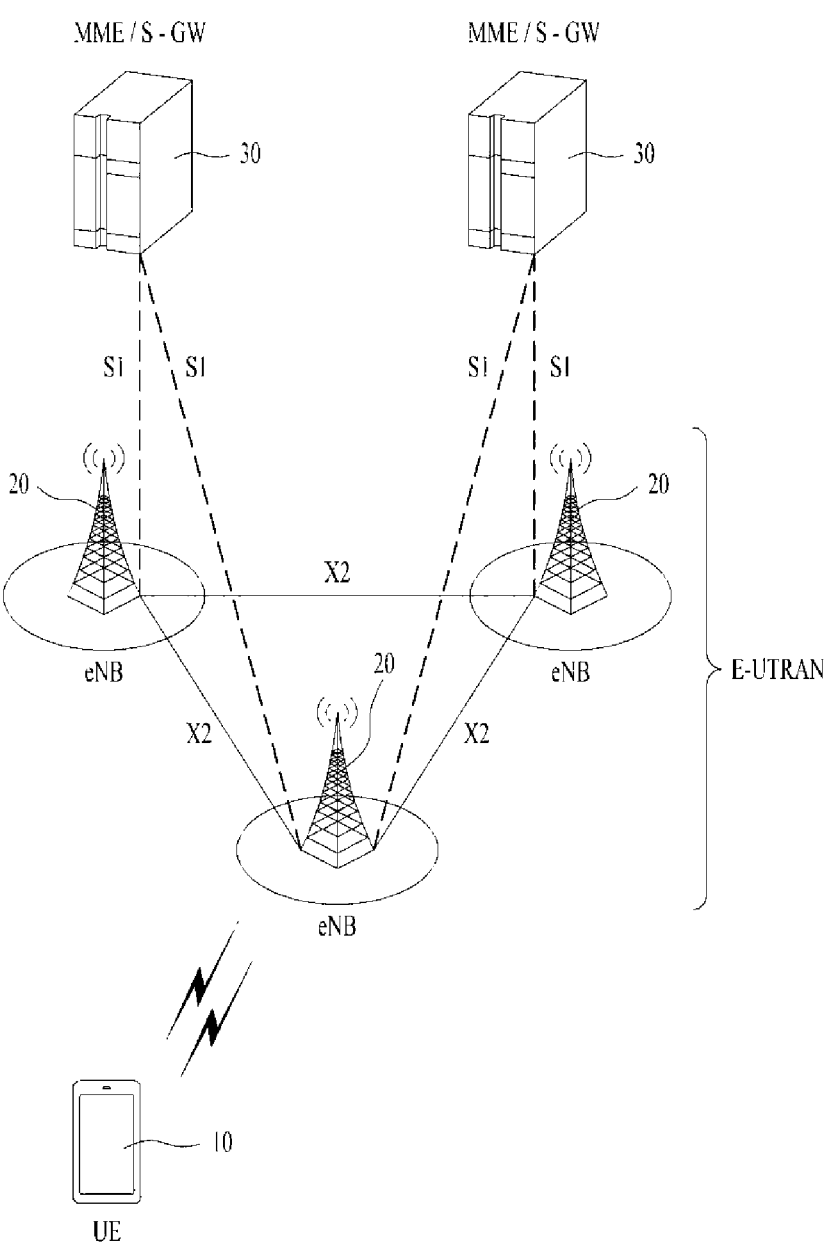
FIG. 1 illustrates the structure of an LTE system to which embodiment(s) are applicable.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
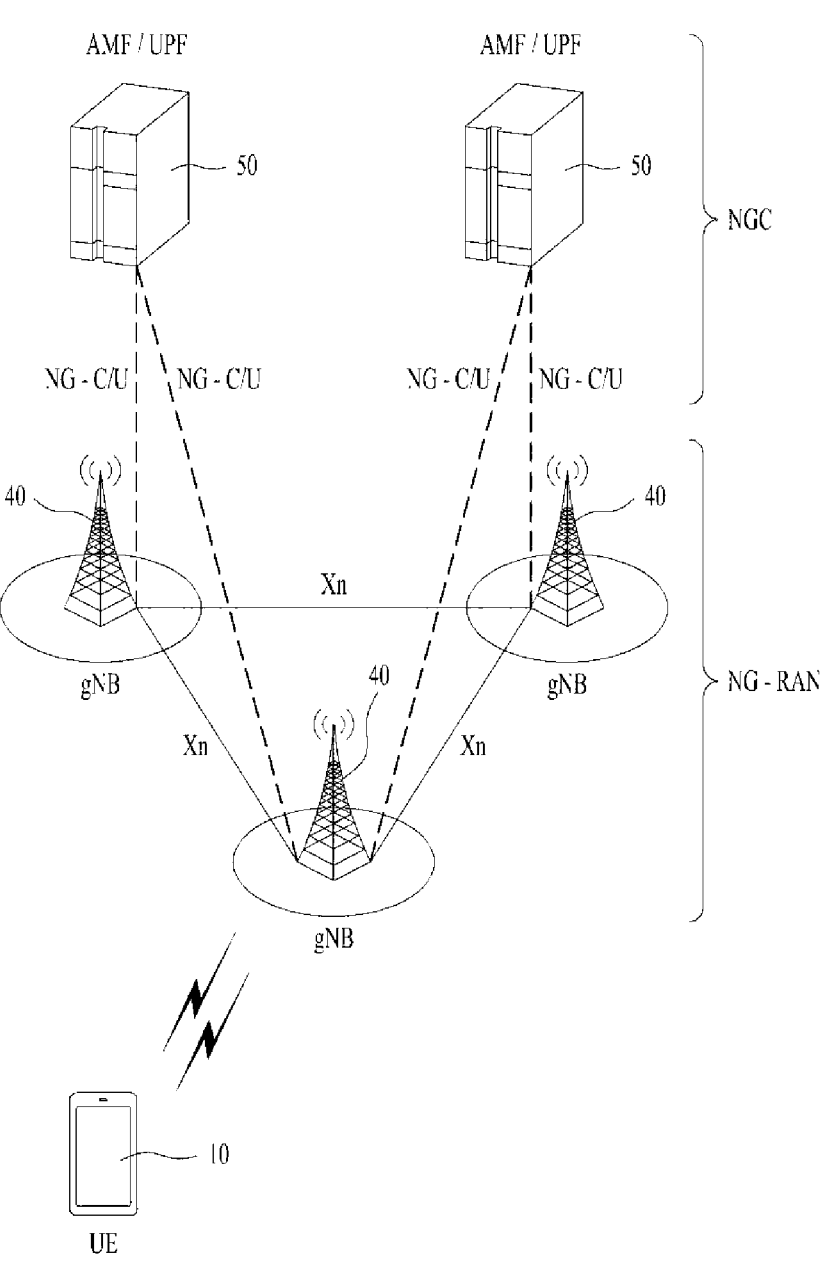
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
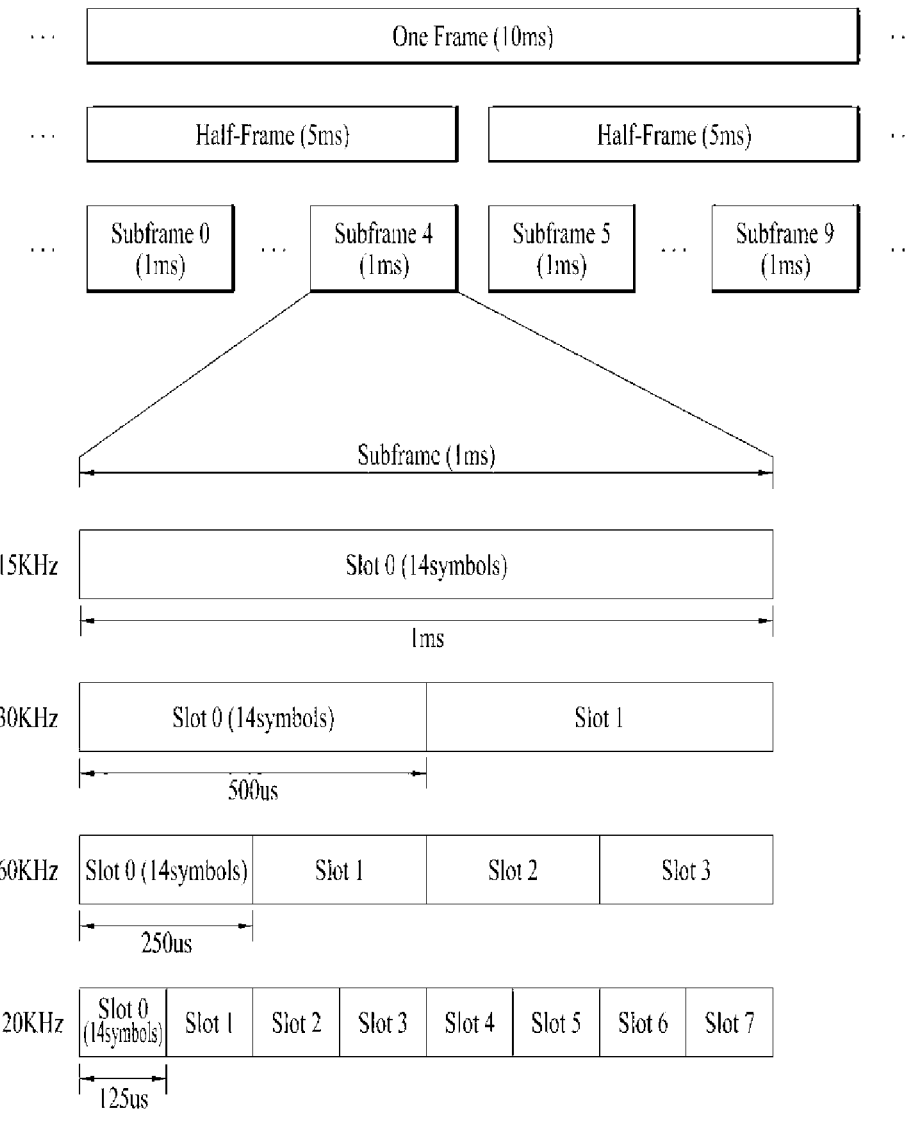
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$ and the number of slots per subframe $N^{subframe,u}_{slot}$ slot according to an SCS configuration u in the NCP case.

TABLE 1

| SCS (15*2u) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 KHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHZ (or 5850 MHZ, 5900 MHZ, 5925 MHz, etc.) or higher. For example, the frequency band of 6 GHZ (or 5850 MHZ, 5900 MHZ, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
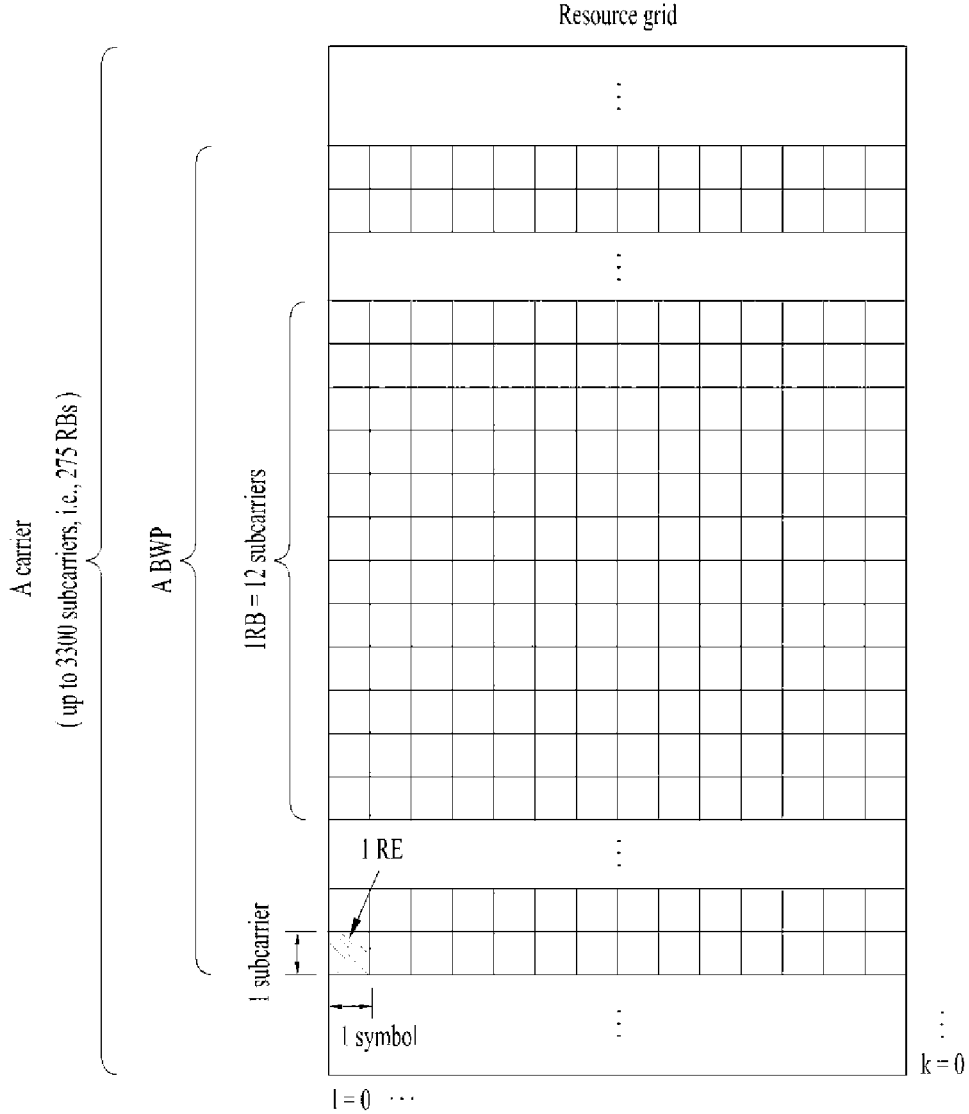
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signaling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP.

Figure 5:
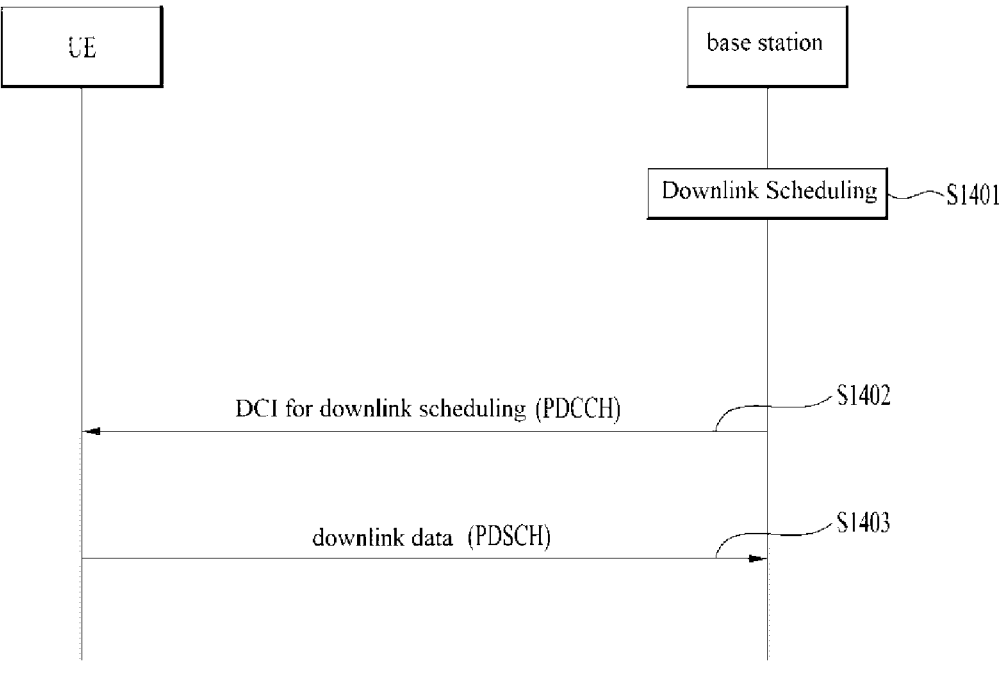
FIG. 5 illustrates a procedure in which a base station transmits a downlink signal to a UE.

FIG. 5 illustrates a procedure in which a base station transmits a downlink (DL) signal to a UE Referring to FIG. 5, the BS schedules DL transmission in relation to, for example, frequency/time resources, a transport layer, a DL precoder, and an MCS (S1401). In particular, the BS may determine a beam for PDSCH transmission to the UE through the above-described operations.

The UE receives downlink control information (DCI) for DL scheduling (i.e., including scheduling information about the PDSCH) from the BS on the PDCCH (S1402).

DCI format 1_0 or 1_1 may be used for DL scheduling. In particular, DCI format 1_1 includes the following information: an identifier for DCI formats, a bandwidth part indicator, frequency domain resource assignment, time domain resource assignment, a PRB bundling size indicator, a rate matching indicator, a ZP CSI-RS trigger, antenna port(s), transmission configuration indication (TCI), an SRS request, and a demodulation reference signal (DMRS) sequence initialization.

In particular, according to each state indicated in the antenna port(s) field, the number of DMRS ports may be scheduled, and single-user (SU)/multi-user (MU) transmission may also be scheduled.

In addition, the TCI field is configured in 3 bits, and the QCL for the DMRS is dynamically indicated by indicating a maximum of 8 TCI states according to the value of the TCI field.

The UE receives DL data from the BS on the PDSCH (S1403).

When the UE detects a PDCCH including DCI format 1_0 or 1_1, it decodes the PDSCH according to an indication by the DCI. Here, when the UE receives a PDSCH scheduled by DCI format 1, a DMRS configuration type may be configured for the UE by a higher layer parameter 'dmrs-Type', and the DMRS type is used to receive the PDSCH. In addition, the maximum number of front-loaded DMRS symbols for the PDSCH may be configured for the UE by the higher layer parameter 'maxLength'

In the case of DMRS configuration type 1, when a single codeword is scheduled for the UE and an antenna port mapped to an index of {2, 9, 10, 11, or 30} is specified, or when two codewords are scheduled for the UE, the UE assumes that any of the remaining orthogonal antenna ports is not associated with PDSCH transmission to another UE.

Alternatively, in the case of DMRS configuration type 2, when a single codeword is scheduled for the UE and an antenna port mapped to an index of {2, 10, or 23} is specified, or when two codewords are scheduled for the UE, the UE assumes that any of the remaining orthogonal antenna ports is not associated with PDSCH transmission to another UE.

When the UE receives the PDSCH, it may assume that the precoding granularity P' is a consecutive resource block in the frequency domain. Here, P' may correspond to one of {2, 4, wideband}.

When P' is determined as wideband, the UE does not expect scheduling with non-contiguous PRBs, and may assume that the same precoding is applied to the allocated resources.

On the other hand, when P' is determined as any one of {2, 4}, a precoding resource block group (PRG) is divided into P' contiguous PRBs. The number of actually contiguous PRBs in each PRG may be greater than or equal to 1. The UE may assume that the same precoding is applied to contiguous DL PRBs in the PRG.

In order to determine a modulation order, a target code rate, and a transport block size in the PDSCH, the UE first reads the 5-bit MCD field in the DCI, and determines the modulation order and the target code rate. Then, it reads the redundancy version field in the DCI, and determines the redundancy version. Then, the UE determines the transport block size based on the number of layers and the total number of allocated PRBs before rate matching.

Figure 6:
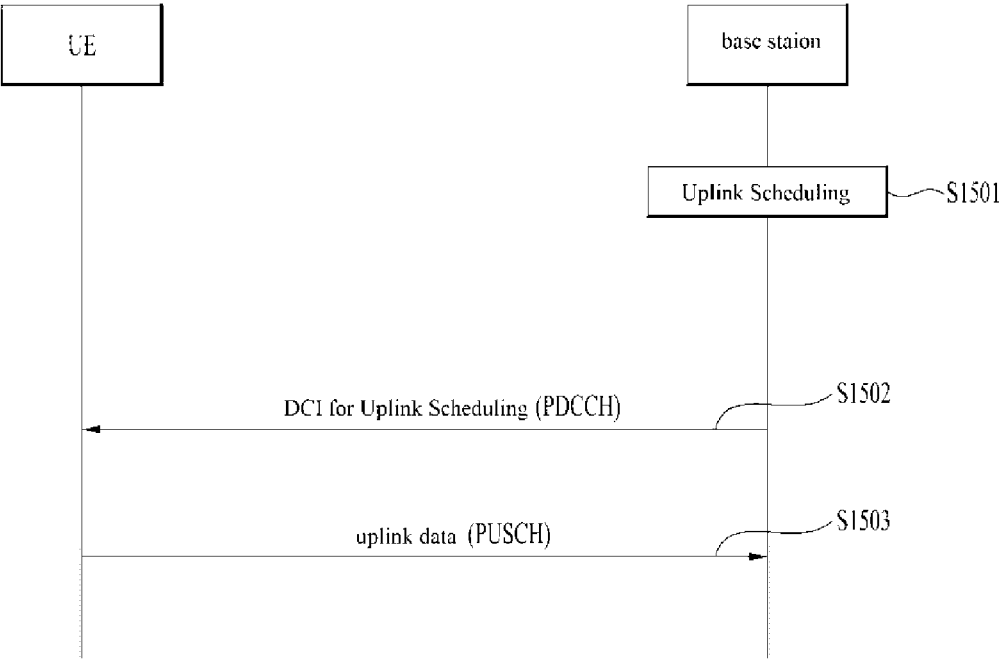
FIG. 6 illustrates a procedure in which a UE transmits an uplink signal to a base station.

FIG. 6 illustrates a procedure in which a UE transmits an uplink (UL) signal to a BS.

Referring to FIG. 6, the BS schedules UL transmission in relation to, for example, frequency/time resources, a transport layer, a UL precoder, and an MCS (S1501). In particular, the BS may determine, through the above-described operations, a beam for PUSCH transmission of the UE.

The UE receives DCI for UL scheduling (including scheduling information about the PUSCH) from the BS on the PDCCH (S1502).

DCI format 0_0 or 0_1 may be used for UL scheduling. In particular, DCI format 0_1 includes the following information: an identifier for DCI formats, a UL/supplementary UL (SUL), a bandwidth part indicator, frequency domain resource assignment, time domain resource assignment, a frequency hopping flag, a modulation and coding scheme (MCS), an SRS resource indicator (SRI), precoding information and number of layers, antenna port(s), an SRS request, DMRS sequence initialization, and UL shared channel (UL-SCH) indicator.

In particular, SRS resources configured in an SRS resource set associated with the higher layer parameter 'usage' may be indicated by the SRS resource indicator field. In addition, 'spatialRelationInfo' may be configured for each SRS resource, and the value thereof may be one of {CRI, SSB, SRI}.

The UE transmits UL data to the BS on PUSCH (S1503).

When the UE detects a PDCCH including DCI format 0_0 or 0_1, it transmits the PUSCH according to an indication by the DCI.

For PUSCH transmission, two transmission schemes are supported: codebook-based transmission and non-codebook-based transmission:

i) When the higher layer parameter 'txConfig' is set to 'codebook', the UE is configured for codebook-based transmission. On the other hand, when the higher layer parameter 'txConfig' is set to 'nonCodebook', the UE is configured for non-codebook based transmission. When the higher layer parameter 'txConfig' is not configured, the UE does not expect scheduling by DCI format 0_1. When the PUSCH is scheduled according to DCI format 0_0, PUSCH transmission is based on a single antenna port.

In the case of codebook-based transmission, the PUSCH may be scheduled by DCI format 0_0 or DCI format 0_1, or scheduled semi-statically. When the PUSCH is scheduled by DCI format 0_1, the UE determines the PUSCH transmission precoder based on the SRI, transmit precoding matrix indicator (TPMI) and transmission rank from the DCI, as given by the SRS resource indicator field and the precoding information and number of layers field. The TPMI is used to indicate a precoder to be applied across antenna ports, and corresponds to an SRS resource selected by the SRI when multiple SRS resources are configured. Alternatively, when a single SRS resource is configured, the TPMI is used to indicate a precoder to be applied across antenna ports, and corresponds to the single SRS resource. A transmission precoder is selected from the UL codebook having the same number of antenna ports as the higher layer parameter 'nrofSRS-Ports'. When the higher layer in which the UE is set to 'codebook' is configured with the parameter 'txConfig', at least one SRS resource is configured for the UE. The SRI indicated in slot n is associated with the most recent transmission of the SRS resource identified by the SRI, where the SRS resource precedes the PDCCH carrying the SRI (i.e., slot n).

ii) In the case of non-codebook-based transmission, the PUSCH may be scheduled by DCI format 0_0 or DCI format 0_1, or scheduled semi-statically. When multiple SRS resources are configured, the UE may determine the PUSCH precoder and transmission rank based on the wideband SRI. Here, the SRI is given by the SRS resource indicator in the DCI or by the higher layer parameter 'srs-ResourceIndicator'. The UE may use one or multiple SRS resources for SRS transmission. Here, the number of SRS resources may be configured for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based UL transmission is 4. The SRI indicated in slot n is associated with the most recent transmission of the SRS resource identified by the SRI, where the SRS transmission precedes the PDCCH carrying the SRI (i.e., slot n).

Figure 7:
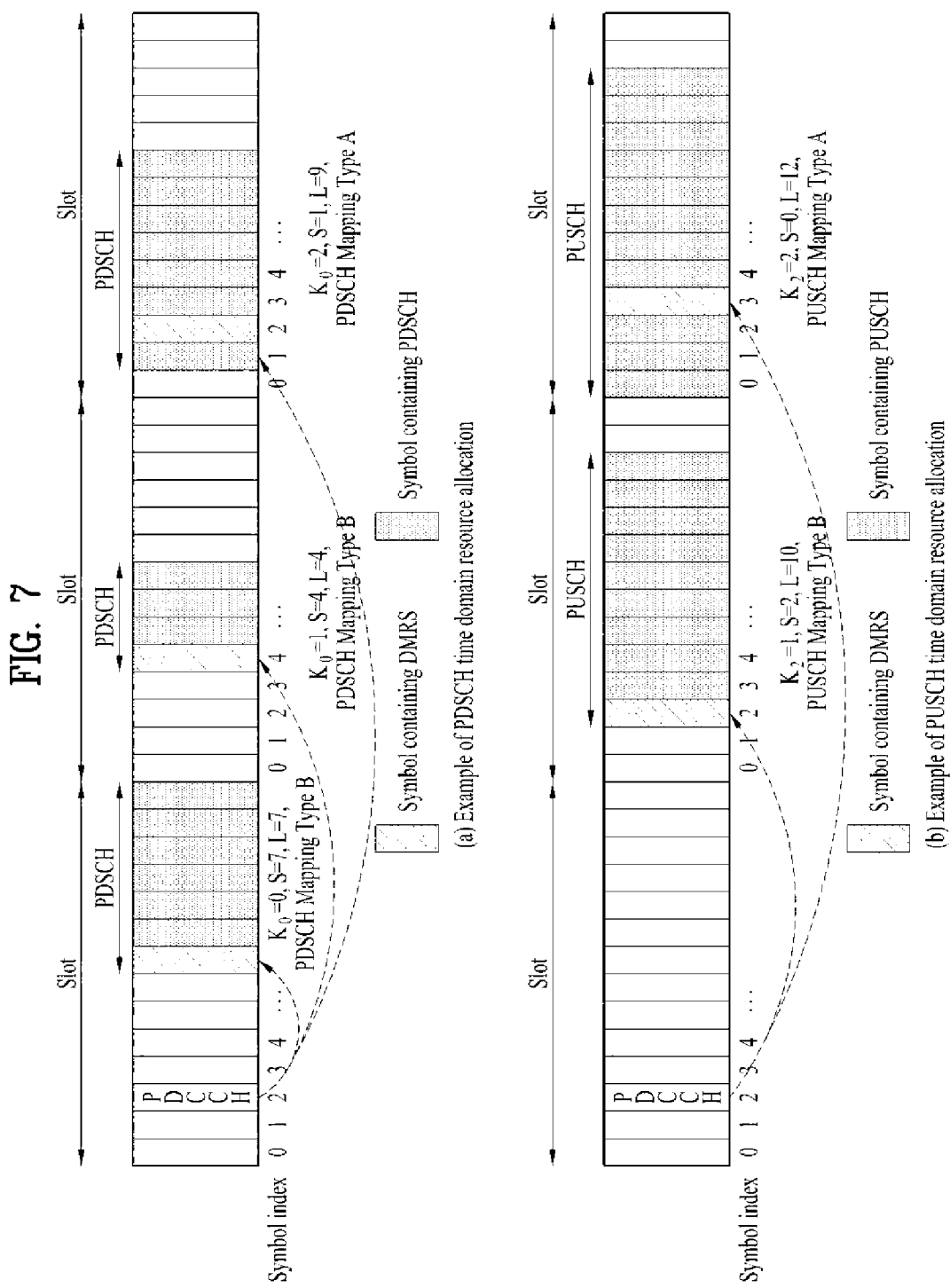
FIG. 7 illustrates an example of time domain resource allocation for a PDSCH by a PDCCH and an example of time domain resource allocation for a PUSCH by a PDCCH.

FIG. 7 illustrates an example of time domain resource allocation for a PDSCH by a PDCCH and an example of time domain resource allocation for a PUSCH by a PDCCH.

DCI carried by the PDCCH in order to schedule a PDSCH or a PUSCH includes a (time domain resource assignment, TDRA) field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214)

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

Resource Allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:

cs-RNTI corresponding to a CS-RNTI for retransmission:
periodicity corresponding to a periodicity of configured grant Type 1:
timeDomainOffset indicating an offset of a resource with respect to system frame number (SFN)=0 in the time domain:
timeDomainAllocation value m that provides a row index m+1 pointing to the allocation table, indicating a combination of the start symbol S, the length L, and the PUSCH mapping type:
frequencyDomainAllocation that provides frequency domain resource allocation; and
mcsAndTBS that provides/Mcs indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to time DomainOffset and S (derived from SLIV) and to recur with periodicity. After the UL grant is configured for configured grant Type 1, the UE may consider that the UL grant recurs in association with each symbol satisfying: [(SFN*number OfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame* numberOfSymbolsPerSlot), for all N>=0, where numberOfSlotsPerFrame and numberOfSymbolsPerSlot indicate the number of consecutive slots per frame and consecutive OFDM symbols per slot.

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPer Frame*numberOfSymbolsPerSlot)+(slot number in the frame*numberOfSymbolsPerSlot)+symbol number in the slot]=[(SFN$_{start\ time}$*number OfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start}$ time, and symbol start time represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively.

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission:

nrofHARQ-Processes that provides the number of HARQ processes for SPS; and example of special fields for DL SPS and UL grant Type 2 scheduling activation PDCCH validation, and an example of special fields for DL SPS and UL grant Type 2 scheduling release PDCCH validation.

Figure 8:
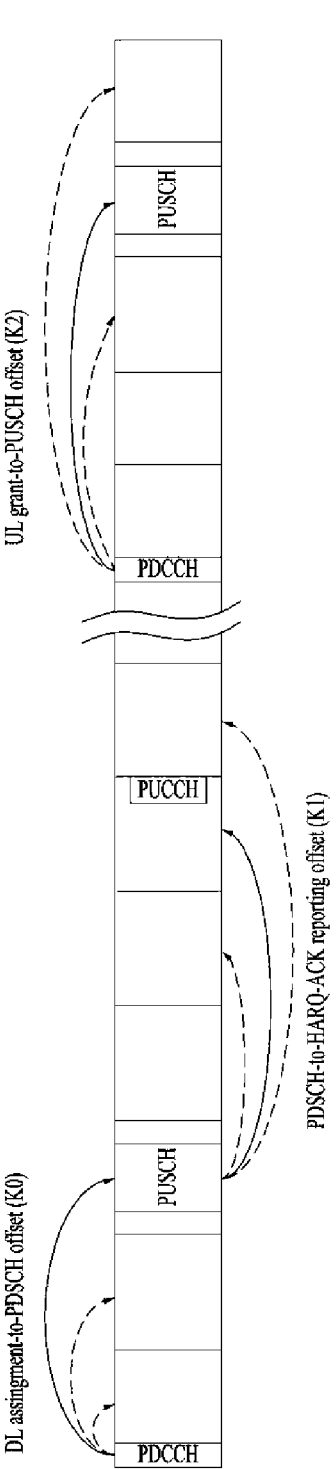
FIG. 8 is a diagram illustrating a HARQ-ACK operation in relation to operation of a UE for reporting control information.

FIG. 8 is a diagram illustrating a HARQ-ACK operation in relation to operation of a UE for reporting control information.

First, HARQ in NR may have the following characteristics (hereinafter, H-1 and H-2).

H-1) 1-bit HARQ-ACK feedback per transport block (TB) may be supported. Here, the operation of one DL HARQ process is supported for some UEs, whereas the operation of one or more DL HARQ processes is supported for a given UE.

H-2) The UE may support a set of minimum HARQ processing times. Here, the minimum HARQ processing time means a minimum required time until a corresponding HARQ-ACK transmission timing from a timing when the UE receives DL data from the BS. In this regard, two UE processing times N1 and K1 may be defined according to (1) symbol granularity and (2) slot granularity. Here, K1 may represent the number of slots from a PDSCH slot to a corresponding HARQ-ACK transmission slot.

First, from the viewpoint of the UE, N1 represents the number of OFDM symbols required for UE processing from the end of PDSCH reception to the earliest possible start of corresponding HARQ-ACK transmission. N1 may be defined as shown in Tables 5 and 6 below according to OFDM numerology (i.e., subcarrier spacing) and a DMRS pattern.

TABLE 5

| Configuration | HARQ Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 | periodicity that provides a periodicity of configured DL assignment for SPS.

After DL assignment is configured for SPS, the UE may consider sequentially that N-th DL assignment occurs in a slot satisfying: (number OfSlotsPerFrame*SFN+slot number in the frame)=[(numberOfSlotsPerFrame*SFN$_{start\ time}$+slot$_{start}$ time)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set. An

TABLE 6

| Configuration | HARQ Timing Parameter | Units | 15 KHz SCS | 30 KHz SCS | 60 KHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

Referring to FIG. 8, a HARQ-ACK timing K1 may indicate the number of slots from a PDSCH slot to a corresponding HARQ-ACK transmission slot. K0 represents the number of slots from a slot with a DL grant PDCCH to a slot with corresponding PDSCH transmission, and K2 represents the number of slots from a slot with a UL grant PDCCH to a slot with corresponding PUSCH transmission. That is, K0, K1, and K2 may be briefly summarized as shown in Table 7 below.

TABLE 7

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

A slot timing between A and B is indicated by a field in DCI from a set of values. In addition, NR supports different minimum HARQ processing times between UEs. The HARQ processing time includes a delay between a DL data reception timing and a corresponding HARQ-ACK transmission timing and a delay between a UL grant reception timing and a corresponding UL data transmission timing. The UE transmits the capability of a minimum HARQ processing time thereof to the BS. Asynchronous and adaptive DL HARQ is supported at least in enhanced mobile broadband (eMBB) and ultra-reliable low latency (URLLC).

From the viewpoint of the UE, HARQ ACK/NACK feedback for multiple DL transmissions in the time domain may be transmitted in one UL data/control domain. A timing between DL data reception and corresponding acknowledgment is indicated by a field in DCI from a set of values, and the set of values is configured by a higher layer. The timing is defined at least for the case in which the timing is not known to the UE.

Figure 9:
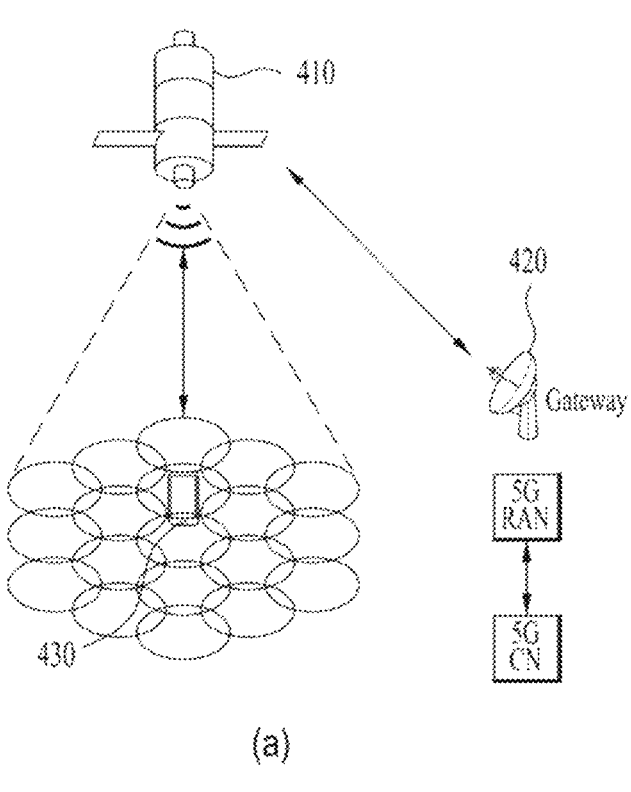
FIG. 9 illustrates a non-terrestrial network (NTN).
Figure 9:
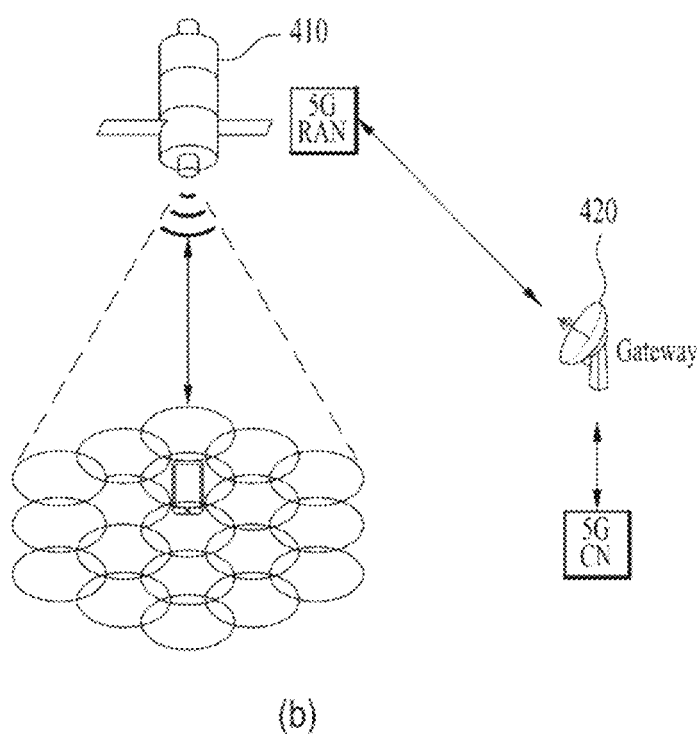

FIG. 9 illustrates a non-terrestrial network (NTN).

A non-terrestrial network (NTN) refers to a wireless network configured using satellites (e.g., geostationary earth orbit satellites (GEO)/low-earth orbit satellites (LEO)). Based on the NTN, coverage may be extended and a highly reliable network service may be provided. For example, the NTN may be configured alone, or may be combined with a conventional terrestrial network to configure a wireless communication system. For example, in the NTN network, i) a link between a satellite and a UE, ii) a link between satellites, iii) a link between a satellite and a gateway, and the like may be configured.

The following terms may be used to describe the configuration of a wireless communication system employing satellites.

Satellite: a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 lm, or Geostationary satellite Earth Orbit (GEO) at 35 786 km altitude.

Satellite network: Network, or segments of network, using a space-borne vehicle to embark a transmission equipment relay node or base station.

Satellite RAT: a RAT defined to support at least one satellite.

5G Satellite RAT: a Satellite RAT defined as part of the New Radio.

5G satellite access network: 5G access network using at least one satellite.

Terrestrial: located at the surface of Earth.

Terrestrial network: Network, or segments of a network located at the surface of the Earth.

Use cases that may be provided by a communication system employing a satellite connection may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

For example, a 5G satellite access network may be connected to a 5G core Network. In this case, the satellite may be a bent pipe satellite or a regenerative satellite. The NR radio protocols may be used between the UE and the satellite. Also, F1 interface may be used between the satellite and the gNB.

As described above, a non-terrestrial network (NTN) refers to a wireless network configured using a device that is not fixed on the ground, such as satellite. A representative example is a satellite network. Based on the NTN, coverage may be extended and a highly reliable network service may be provided. For example, the NTN may be configured alone, or may be combined with an existing terrestrial network to configure a wireless communication system.

Use cases that may be provided by a communication system employing an NTN may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

Referring to FIG. 9, the NTN includes one or more satellites 410, one or more NTN gateways 420 capable of communicating with the satellites, and one or more UEs (/BSs) 430 capable of receiving mobile satellite services from the satellites. For simplicity, the description is focused on the example of the NTN including satellites, but is not intended to limit the scope of the present disclosure. Accordingly, the NTN may include not only the satellites, but also aerial vehicles (Unmanned Aircraft Systems (UAS) encompassing tethered UAS (TUA), Lighter than Air UAS (LTA), Heavier than Air UAS (HTA), all operating in altitudes typically between 8 and 50 km including High Altitude Platforms (HAPs)).

The satellite 410 is a space-borne vehicle equipped with a bent pipe payload or a regenerative payload telecommunication transmitter and may be located in a low earth orbit (LEO), a medium earth orbit (MEO), or a geostationary earth orbit (GEO). The NTN gateway 420 is an earth station or gateway existing on the surface of the earth, and provides sufficient RF power/sensitivity to access the satellite. The NTN gateway corresponds to a transport network layer (TNL) node.

The NTN may have i) a link between a satellite and a UE, ii) a link between satellites, iii) a link between a satellite and an NTN gateway. A service link refers to a radio link between a satellite and a UE. Inter-satellite links (ISLs) between satellites may be present when there are multiple satellites. A feeder link refers to a radio link between an NTN gateway and a satellite (or UAS platform). The gateway may be connected to a data network and may communicate with a satellite through the feeder link. The UE may communicate via the satellite and service link.

As NTN operation scenarios, two scenarios which are based on transparent payload and regenerative payload, respectively may be considered. FIG. 9-(a) shows an example of a scenario based on a transparent payload. In the scenario based on the transparent payload, the signal repeated by the payload is not changed. The satellites 410 repeat the NR-Uu radio interface from the feeder link to the service link (or vice versa), and the satellite radio interface (SRI) on the feeder link is NR-Uu. The NTN gateway 420 supports all functions necessary to transfer the signal of the NR-Uu interface. Also, different transparent satellites may be connected to the same gNB on the ground. FIG. 9-(b) shows an example of a scenario based on a regenerative payload. In the scenario based on the regenerative payload, the satellite 410 may perform some or all of the functions of a conventional BS (e.g., gNB), and may thus perform some or all of frequency conversion/demodulation/decoding/ modulation. The service link between the UE and a satellite is established using the NR-Uu radio interface, and the feeder link between the NTN gateway and a satellite is established using the satellite radio interface (SRI). The SRI corresponds to a transport link between the NTN gateway and the satellite.

The UE 430 may be connected to 5GCN through an NTN-based NG-RAN and a conventional cellular NG-RAN A feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed:

A regenerative payload: Radio Frequency filtering, Frequency conversion and amplification as well as demodulation/decoding, switch and/or routing, coding/ modulation. This is effectively equivalent to having all or part of base station functions (e.g., gNB) on board the satellite (or UAS platform).

Inter-satellite links (ISL) optionally in case of a constellation of satellites. This will require regenerative payloads on board the satellites. ISL may operate in RF frequency or optical bands.

User Equipment is served by the satellite (or UAS platform) within the targeted service area.

Table 8 below defines various types of satellites (or UAS platforms).

TABLE 8

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km | simultaneously. Alternatively, the UE may be connected to the 5GCN via two or more NTNs (e.g., LEO NTN and GEO NTN, etc.) simultaneously.

Figure 10:
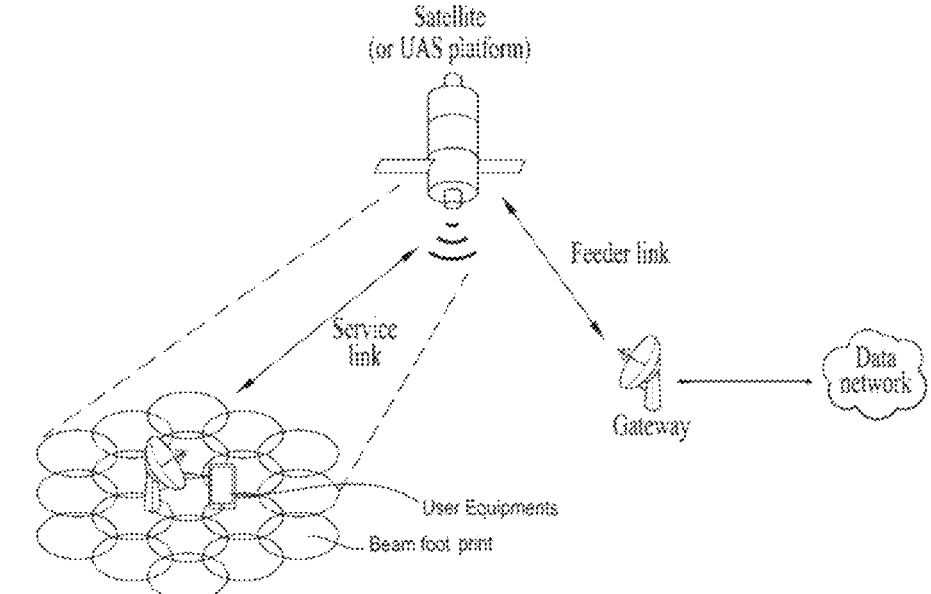
FIG. 10 illustrates an overview and a scenario of an NTN.
Figure 10:
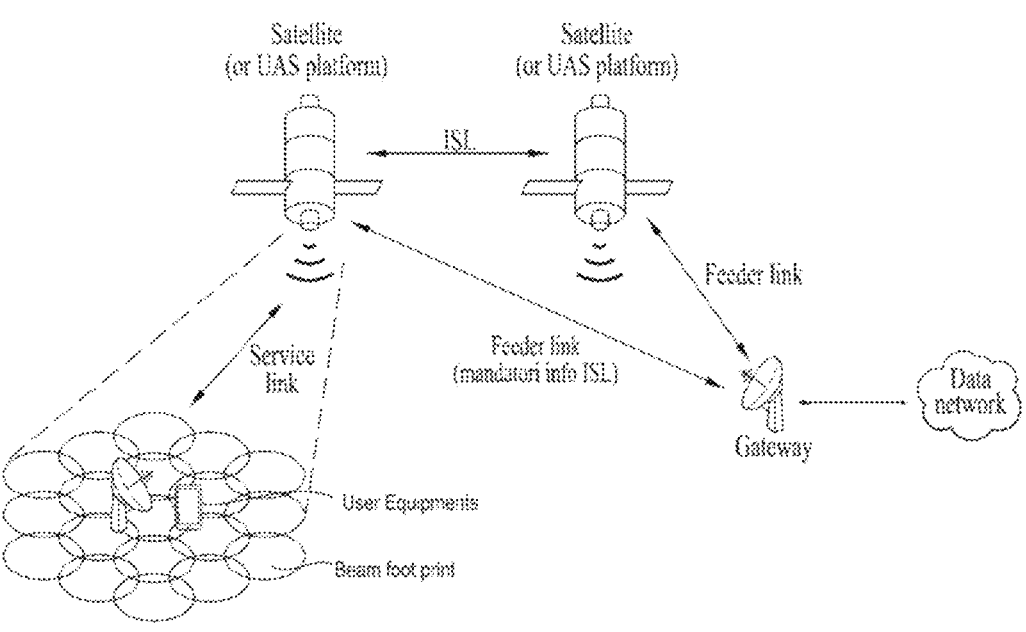

FIG. 10 illustrates an overview and a scenario of an NTN. NTN refers to a network or network segment in which a satellite (or UAS platform) uses RF resources. Typical scenarios of the NTN providing access to a UE include an NTN scenario based on a transparent payload as shown in FIG. 10-(a) and an NTN scenario based on a regenerative payload as shown in FIG. 10-(b).

NTN typically features the following elements,

One or several sat-gateways that connect the Non-Terrestrial Network to a public data network A GEO satellite is fed by one or several sat-gateways which are deployed across the satellite targeted coverage (e.g., regional or even continental coverage). We assume that UE in a cell are served by only one sat-gateway.

A Non-GEO satellite served successively by one or several sat-gateways at a time. The system ensures service and feeder link continuity between the successive serving sat-gateways with sufficient time duration to proceed with mobility anchoring and hand-over.

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links. HEO satellite systems are not considered in this document.

An NTN that provides access to a terminal in six reference scenarios described below can be considered.

Circular orbiting and notional station keeping platforms.

Highest RTD constraint

Highest Doppler constraint

A transparent and a regenerative payload

One ISL case and one without ISL. Regenerative payload is mandatory in the case of inter-satellite links.

Fixed or steerable beams resulting respectively in moving or fixed beam foot print on the ground Six scenarios are considered as depicted in Table 9 and are detailed in Table 10.

TABLE 9

|  | Transparent satellite | Regenerative satellite |
| --- | --- | --- |
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 10

| Scenarios | GEO based non-terrestrial access network (Scenario A and B) | LEO based non-terrestrial access network (Scenario C & D) |
| --- | --- | --- |
| Orbit type | notional station keeping position fixed in terms of elevation/azimuth with respect to a given earth point | circular orbiting around the earth |
| Altitude | 35,786 km | 600 km 1,200 km |
| Spectrum (service link) | <6 GHz (e.g., 2 GHZ) >6 GHz (e.g., DL 20 GHZ, UL 30 GHZ) | |
| Max channel bandwidth capability (service link) | 30 MHz for band <6 GHz 1 GHz for band >6 GHz | |
| Payload | Scenario A: Transparent (including radio frequency function only) Scenario B: regenerative (including all or part of RAN functions) | Scenario C: Transparent (including radio frequency function only) Scenario D: Regenerative (including all or part of RAN functions) |
| Inter-Satellite link | No | Scenario C: No Scenario D: Yes/No (Both cases are possible.) |
| Earth-fixed beams | Yes | Scenario C1: Yes (steerable beams), see note 1 Scenario C2: No (the beams move with the satellite) Scenario D 1: Yes (steerable beams), see note 1 Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm(1200 km) |
| Max Doppler shift variation (earth fixed user equipment) | 0.000 045 ppm/s | 0.27 ppm/s (600 km) 0.13 ppm/s(1200 km) |
| User equipment motion on the earth | 1200 km/h (e.g., aircraft) | 500 km/h (e.g., high speed train) Possibly 1200 km/h (e.g., aircraft) |
| User equipment antenna types | Omnidirectional antenna (linear polarization), assuming 0 dBi Directive antenna (up to 60 cm equivalent aperture diameter in circular polarization) | |

TABLE 10-continued

| Scenarios | GEO based non-terrestrial access network (Scenario A and B) | LEO based non-terrestrial access network (Scenario C & D) |
|---|---|---|
| User equipment Tx power | Omnidirectional antenna: UE power class 3 with up to 200 mW | |
| | Directive antenna: up to 20 W | |
| User equipment Noise figure | Omnidirectional antenna: 7 dB | |
| | Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:

Each satellite has the capability to steer beams towards fixed points on earth using beamforming techniques. This is applicable for a period of time corresponding to the visibility time of the satellite

NOTE 2

Max delay variation within a beam (earth fixed user equipment) is calculated based on Min Elevation angle for both gateway and user equipment

NOTE 3

Max differential delay within a beam is calculated based on Max beam foot print diameter at nadir

NOTE 4:

Speed of light used for delay calculation is 299792458 m/s.

NOTE 5:

The Maximum beam foot print size for GEO is based on current state of the art GEO High Throughput systems, assuming either spot beams at the edge of coverage (low elevation).

NOTE 6:

The maximum differential delay at cell level has been computed considering the one at beam level for largest beam size. It doesn't preclude that cell may include more than one beam when beam size are small or medium size. However, the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Hereinafter, the NTN reference point will be described.

Figure 11:
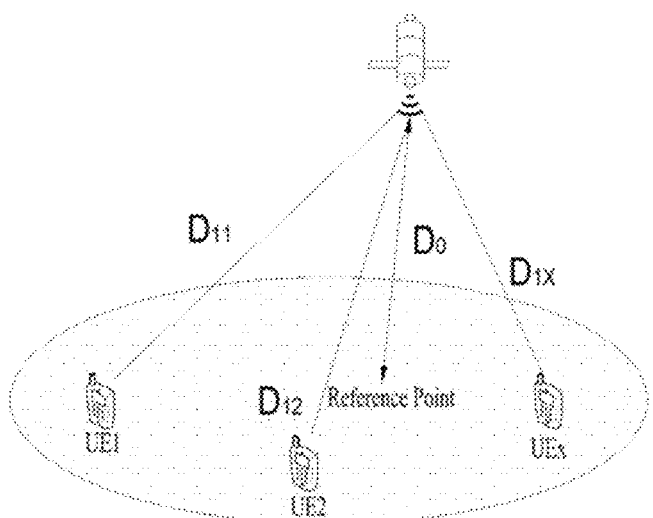
FIG. 11 illustrates TA components of the NTN.
Figure 11:
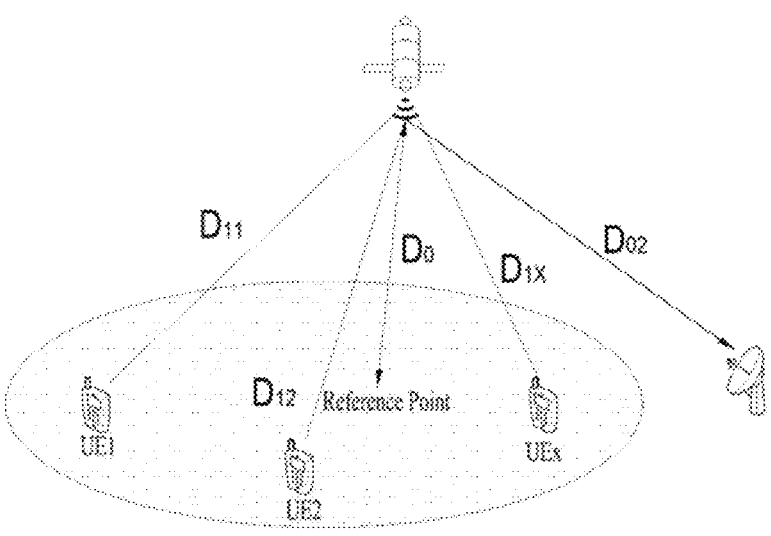

FIG. 11 illustrates TA components of the NTN. Here, the TA offset (NTAoffset) may not be plotted.

With consideration on the larger cell coverage, long round trip time (RTT) and high Doppler, enhancements are considered to ensure the performance for timing and frequency synchronization for UL transmission.

Referring to FIG. 11, a reference point related to timing advance (TA) of initial access and subsequent TA maintenance/management is illustrated. Terms defined in relation to FIG. 11 are described below.

Option 1: Autonomous acquisition of the TA at UE with UE known location and satellite ephemeris.

Regarding option 1, the required TA value for UL transmission including PRACH can be calculated by the UE. The corresponding adjustment can be done, either with UE-specific differential TA or full TA (consisting of UE specific differential TA and common TA).

W.r.t the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

W.r.t the UE specific differential TA only, additional indication on a single reference point should be signaled to UEs per beam/cell for achieving the UL timing alignment among UEs within the coverage of the same beam/cell. Timing offset between DL and UL frame timing at the network side should also be managed by the network regardless of the satellite payload type.

With concern on the accuracy on the self-calculated TA value at the UE side, additional TA signalling from network to UE for TA refinement, e.g., during initial access and/or TA maintenance, can be determined in the normative work.

Option 2: Timing advanced adjustment based on network indication

Regarding option 2, the common TA, which refers to the common component of propagation delay shared by all UEs within the coverage of same satellite beam/cell, is broadcasted by the network per satellite beam/cell. The calculation of this common TA is conducted by the network with assumption on at least a single reference point per satellite beam/cell.

The indication for UE-specific differential TA from network as the Rel-15 TA mechanism is also needed. For satisfying the larger coverage of NTN, extension of value range for TA indication in RAR, either explicitly or implicitly, is identified. Whether to support negative TA value in corresponding indication will be determined in the normative phase. Moreover, indication of timing drift rate, from the network to UE, is also supported to enable the TA adjustment at UE side.

For calculation of common TA in the above two options, single reference point per beam is considered as the baseline. Whether and how to support the multiple reference points can be further discussed in the normative work.

For the UL frequency compensation, at least for LEO system, the following solutions are identified with consideration on the beam specific post-compensation of common frequency offset at the network side:

Regarding option 1, both the estimation and pre-compensation of UE-specific frequency offset are conducted at the UE side. The acquisition of this value can be done by utilizing DL reference signals, UE location and satellite ephemeris.

Regarding option 2, the required frequency offset for UL frequency compensation at least in LEO systems is indicated by the network to UE. The acquisition on this value can be done at the network side with detection of UL signals, e.g., preamble.

Indication of compensated frequency offset values by the network is also supported in case that compensation of the frequency offset is conducted by the network in the uplink and/or the downlink respectively. However, indication of Doppler drift rate is not necessary.

Hereinafter, more delay-tolerant re-transmission mechanisms will be described in detail.

As follows, two main aspects of a retransmission mechanism with improved delay tolerance can be discussed.

Disabling of HARQ in NR NTN

HARQ optimization in NR-NTN

HARQ Round Trip Time in NR is of the order of several ms. The propagation delays in NTN are much longer, ranging from several milliseconds to hundreds of milliseconds depending on the satellite orbit. The HARQ RTT can be much longer in NTN. It was identified early in the study phase that there would be a need to discuss potential impact and solutions on HARQ procedure. RAN1 has focused on physical layer aspects while RAN2 has focused on MAC layer aspects.

In this regard, disabling of HARQ in NR NTN may be considered.

It was discussed that when UL HARQ feedback is disabled, there could be issues if (i) MAC CE and RRC signalling are not received by UE, or (ii) DL packets not correctly received by UE for a long period of time without gNB knowing it.

The following were discussed without convergence on the necessity of introducing such solutions for NTN when HARQ feedback is disabled (1) Indicate HARQ disabling via DCI in new/re-interpreted field (2) New UCI feedback for reporting DL transmission disruption and or requesting DL scheduling changes The following possible enhancements for slot-aggregation or blind repetitions were considered. There is no convergence on the necessity of introducing such enhancements for NTN.

(1) Greater than 8 slot-aggregation (2) Time-interleaved slot aggregation (3) New MCS table Next, a method for optimizing HARQ for the NR NTN will be described.

Solutions to avoid reduction in peak data rates in NTN were discussed. One solution is to increase the number of HARQ processes to match the longer satellite round trip delay to avoid stop-and-wait in HARQ procedure. Another solution is to disable UL HARQ feedback to avoid stop-and-wait in HARQ procedure and rely on RLC ARQ for reliability. The throughput performance for both types of solutions was evaluated at link level and system level by several contributing companies.

The observations from the evaluations performed on the effect of the number of HARQ processes on performance are summarized as follows:

Three sources provided link-level simulations of throughput versus SNR with the following observations:

One source simulated with a TDL-D suburban channel with elevation angle of 30 degrees with BLER target of 1% for RLC ARQ with 16 HARQ processes, and BLER targets 1% and 10% with 32/64/128/256 HARQ processes. There was no observable gain in throughput with increased number of HARQ processes compared to RLC layer re-transmission with RTT in {32, 64, 128, 256} ms.

One source simulated with a TDL-D suburban channel with elevation angle of 30 degrees with BLER targets of 0.1% for RLC ARQ with 16 HARQ processes, and BLER targets 1% and 10% with 32 HARQ processes. An average throughput gain of 10% was observed with 32 HARQ processes compared to RLC ARQ with 16 HARQ processes with RTT=32 ms.

One source provides the simulation results in following cases with RTT=32 ms, e.g., assuming BLER targets at 1% for RLC ARQ with 16 HARQ processes, BLER targets 1% and 10% with 32 HARQ processes. There is no observable gain in throughput with 32 HARQ processes compared to RLC ARQ with 16 HARQ processes in case that channel is assumed as TDL-D with delay spread/K-factor taken from system channel model in suburban scenario with elevation angle 30. Performance gain can be observed with other channels, especially, up to 12.5% spectral efficiency gain is achieved in case that channel is assumed as TDL-A in suburban with 30° elevation angle. Moreover, simulation based on the simulation with consideration on other scheduling operations: (i) additional MCS offset, (ii) MCS table based on lower efficiency (iii) slot aggregation with different BLER targets are conducted. Significant gain can be observed with enlarging the HARQ process number.

One source provided system level simulations for LEO=1200 km with 20% resource utilization, 16 and 32 HARQ processes, 15 and 20 UEs per cell, proportional fair scheduling, and no frequency re-use. The spectral efficiency gain per user with 32 HARQ processes compared to 16 HARQ processes depends on the number of UEs. With 15 UEs per beam, an average spectral efficiency gain of 12% at 50% per centile is observed. With 20 UEs per cell there is no observable gain.

The following options were considered with no convergence on which option to choose:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Slot number based

Virtual process ID based with HARQ re-transmission timing restrictions

Reuse HARQ process ID within RTD (time window)

Re-interpretation of existing DCI fields with assistance information from higher layers One source also considered solutions where the HARQ process ID field is increased beyond 4 bits With regards to HARQ enhancements for soft buffer management and stop-and-wait time reduction, the following options were considered with no convergence on which, if any, of the options, to choose:

Option A-1: Pre-active/pre-emptive HARQ to reduce stop-and-wait time

Option A-2: Enabling/disabling of HARQ buffer usage configurable on a per UE and per HARQ process Option A-3: HARQ buffer status report from the UE The number of HARQ processes with additional considerations for HARQ feedback, HARQ buffer size, RLC feedback, and RLC ARQ buffer size should be discussed further when specifications are developed.

The configurations (NR frame structure, NTN system, etc.) discussed above may be combined and applied in the contents described below, or may be supplemented to clarify the technical features of the methods proposed in the present disclosure. In addition, methods related to HARQ disabling, which will be described later, are related to UL transmission and may be equally applied to the DL signal transmission method in the NR system or LTE system described above. It is to be noted that terms, expressions, structures, and the like defined in each system may be appropriately modified or replaced so that the technical idea proposed in this specification can be implemented in the corresponding system.

HARQ Disabling in NTN

As described above, an NR NTN and/or LTE NTN service may be considered to secure wider coverage or to provide a wireless communication service in a place in which it is not easy to install a wireless communication BS. The NTN service may be a service that provides the wireless communication service to UEs by installing the BS in a place that is not located on the ground, for example, in a satellite (a GEO, LEO, or MEO satellite), an airplane, an unmanned aerial vehicle, or a drone, instead of installing the BS on the ground. In this case, a latency problem may occur due to delay when the UE performs HARQ feedback.

Hereinafter, an effective HARQ feedback enabling/disabling technique will be described.

A frequency band for the NR NTN service mainly considers a 2-GHz band (S-band: 2 to 4 GHz) in a band below 6 GHz, and a DL 20-GHz band and a UL 30-GHz band (Ka-band: 26.5 to 40 GHz) in a band above 6 GHz.

Table 11 below summarizes the contents of maximum roundtrip delay for each scenario described in Table 10 above.

As shown in Table 11, maximum delay in the worst case (GEO scenario A) may be up to 540 ms. In this case, when the UE performs HARQ feedback, there is a possibility that a latency problem will arise due to additional delay. For this reason, the following scenarios related to HARQ disabling may be considered.

In a scenario, whether HARQ feedback is enabled or disabled may be configured for each UE and each HARQ process.

As described above, the case in which the HARQ process is enabled may be when the HARQ process is requested to be performed, and the case in which the HARQ process is disabled may be when the HARQ process is not requested to be performed.

In order to solve the latency problem caused by such delay, it is necessary to effectively indicate whether the HARQ process is enabled or disabled as needed in the NTN service. Hereinbelow, a method of indicating HARQ-enabled/disabled based on a semi-persistent scheduling (SPS) configuration will be described.

SPS has been introduced for the purpose of greatly reducing overhead of a control channel of an application requiring persistent radio resource assignment, such as voice over Internet protocol (VOIP). This is because, when there is no SPS, all DL and/or UL resources should be granted or allocated through an access grant message on a PDCCH.

When SPS is used, activation/release of the SPS may be configured by a combination of code points of specific fields in DCI as defined in Tables 11 and 12 (see TS 38.213). Here,

TABLE 11

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600 km)<br>41.77 ms (1200 km)<br>Scenario D:<br>(regenerative payload: service link only)<br>12.89 ms (600 km)<br>20.89 ms (1200 km) | the specific fields in the DCI may include a HARQ process number field, a redundancy version (RV) field, an MCS field, and a frequency domain resource assignment field (see Table 12 and/or Table 13).

TABLE 12

| | DCI format 0_0/0_1/0_2 | DCI format 1_0/1_2 | DCI format 1_1 |
|---|---|---|---|
| HARQ process number | set to all '0's/0_2 | set to all '0's | set to all '0's |
| Redundancy version | set to all '0's | set to all '0's | For the enabled transport block: set to all '0's |

TABLE 13

| | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 0 or for FDRA Type 2 with $\mu = 1$, set to all '1's for FDRA Type 1 or for FDRA Type 2 with $\mu = 0$ | set to all '0's for FDRA Type 0 set to all '1's for FDRA Type 1 |

Even in the aforementioned NTN, SPS may be applied or introduced for the purpose of significantly reducing overhead of the control channel. In other words, even in the case of DL SPS, HARQ feedback (or a HARQ process) may be enabled or disabled according to quality of service (QOS) of a corresponding TB or according to a channel situation. Here, the case in which the HARQ process is enabled may be when the HARQ process is requested to be performed, and the case in which the HARQ process is disabled may be when the HARQ process is not requested to be performed. Specific details are as follows.

(1) First Indication Method-Indication Through DCI

The first indication method may be a method of indicating whether HARQ feedback is enabled or disabled for a certain period of time through DCI in a situation in which an SPS PDSCH is activated and a PUCCH resource is given (or the PUCCH resource is allocated).

Specifically, in a situation in which the SPS PDSCH is activated and the PUCCH resource is given (or the PUCCH resource is allocated), HARQ feedback may be activated or deactivated for a certain period of time through separate DCI. For example, whether a specific HARQ process is enabled or disabled may be indicated or configured through separate DCI different from DCI for activating the SPS PDSCH. Here, the enabled or disabled HARQ process may be all or part of HARQ processes configured for the UE.

Alternatively, when whether the HARQ process is enabled or disabled is indicated through the DCI for activating the SPS PDSCH, a specific HARQ process enable field may be newly defined or configured in the DCI. In other words, the SPS PDSCH may be activated through one DCI, and whether the HARQ process is enabled or disabled may be indicated through the specific HARQ process enable field newly defined in the one DCI.

(2) Second Indication Method-Indication Through SPS Configuration (e.g., RRC Signaling)

The second indication method may be a method of configuring multiple SPSs in which a HARQ feedback enabled SPS and a HARQ feedback disabled SPS are separately configured. In other words, the second indication method may be a method configured with multiple SPS configurations including an SPS configuration in which HARQ feedback is enabled and an SPS configuration in which HARQ feedback is disabled.

For example, the multiple SPS configurations may be distinguished by indexes/IDs (e.g., sps-ConfigIndex-r16), and a HARQ feedback enable/disable field may be newly configured for each SPS configuration corresponding to each index/ID. In this case, an SPS configuration in which HARQ feedback is enabled or an SPS configuration in which HARQ feedback is disabled may be configured/indicated based on the newly configured field.

In the case of the second indication method, a separate HARQ enable field may be newly defined in and/or added to SPS-Config defined in Table 14 (see TS 38.331). During an SPS configuration, a HARQ feedback enabled SPS and a HARQ feedback disabled SPS may be configured through the HARQ enable field. That is, in the case of the second indication method, whether HARQ feedback is enabled or disabled may be indicated for each SPS configuration through SPS configuration information (or a separate field included in an SPS-Config parameter) received through higher layer signaling (e.g., RRC signaling) of a BS (or NTN).

TABLE 14

| SPS-Config |
| --- |
| The IE SPS-Config is used to configure downlink semi-persistent transmission. Multiple Downlink SPS configurations may be configured in one BWP of a serving cell. |

| SPS-Config information element |
| --- |

```
-- ASN1START
-- TAG-SPS-CONFIG-START
SPS-Config ::=                 SEQUENCE {
    periodicity                    ENUMERATED {ms10, ms20, ms32, ms40, ms64, ms90, ms128, ms160,
ms322, ms640, spare6, spare5, space4, spare3, spare2,
spare1},
    nrofHARQ-Processes             INTEGER (1..3),
    n1PUCCH-AN                     PUCCH-ResourceId
OPTIONAL,   -- Need M
    mcs-Table                      ENUMERATED {qam64LowSE}
OPTIONAL,   -- Need S
    ...,
    ..
    ..
    aps-ConfigIndex-r16            SPS-ConfigIndex-r16
OPTIONAL,   -- Need N
    harq-ProcID-Offset-r16         INTEGER (0..15)
OPTIONAL,   -- Need N
    periodicityExt-r16             INTEGER (1..5120)
OPTIONAL,   -- Need N
    harq-CodebookID-r16            INTEGER (1..2)
OPTIONAL   -- Need N
    ..
    ..
}
-- TAG-SPS-CONFIG-STOP
-- ASN1STOP
```

| SPS-Config field descriptions |
| --- | harq-CodebookID
Indicates the HARQ-ACK codebook index for the corresponding HARQ-ACK codebook for SPS PDSCH and ACK for SPS PDSCH release.
harq-ProcID-Offset
Indicates the offset used in deriving the HARQ process IDs, see TS 38.321 [3], clause 5.3.1.
mcs-Table
Indicates the MCS table the UE shall use for DL SPS (see TS 38.214 [19], clause 5.1.3.1. If present, the UE shall use the MCS table of low-SE 64QAM table indicated in Table 5.1.3.1-3 of TS 38.214 [19]. If this field is absent and field mcs-table in PDSCH-Config is set to 'qam256' and the activating DCI is of format 1_1, the UE applies the 256QAM table indicated in Table 5.1.3.1-2 of TS 38.214 [19]. Otherwise, the UE applies the non-low-SE 64QAM table indicated in Table 5.1.3.1-1 of TS 38.214 [19].
n1PUCCH-AN
HARQ resource for PUCCH for DL SPS. The network configures the resource either as format0 or format1. The actual PUCCH-Resource is configured in PUCCH-Config and referred to by its ID. See TS 38.213 [13], clause 9.2.3.
nrofHARQ-Processes
Number of configured HARQ processes for SPS DL (see TS 38.321 [3], clause 5.8.1).
periodicity
Periodicity for DL SPS (see TS 38.214 [19] and TS 38.321 [3], clause 5.8.1).
periodicityExt
This field is used to calculate the periodicity for DL SPS (see TS 38.214 [19] and see TS 38.321 [3], clause 5, 8.1). If this field is present, the field periodicity is ignored.
The following periodicities are supported depending on the configured subcarrier spacing [slots]:
15 kHz: periodicityExt, where periodicityExt has a value between 1 and 640.
30 kHz: periodicityExt, where periodicityExt has a value between 1 and 1280.
60 kHz with normal CP: periodicityExt, where periodicityExt has a value between 1 and 2560.
60 kHz with ECP: periodicityExt, where periodicityExt has a value between 1 and 2560.
120 kHz: periodicityExt, where periodicityExt has a value between 1 and 5120.
sps-ConfigIndex
Indicates the index of one of multiple SPS configurations.

HARQ Disabling for SPS PDSCH

Regarding HARQ-enabled/disabled, the following scenarios may be considered.

Enabling/disabling of HARQ feedback for DL transmission should be at least configurable per HARQ process via UE-specific RRC signaling.

Extension of the maximum number of HARQ processes may be considered under the following assumptions (minimization of impact on specifications and schedules).

①The maximum number of supported HARQ processes is 32. ② Support for the maximum number of supported HARQ processes in the future may be config-
ured based on capabilities of a UE.

For a DL HARQ process in which HARQ feedback or a
HARQ process is disabled, it is not expected that the UE will
receive other PDSCHs or slot-aggregated PDSCHs sched-
uled for a given HARQ process which starts up to [X] after
reception of the last PDSCH or slot-aggregated PDSCH for
the DL HARQ process is ended. Discussion about an X
value and a unit of the X value to be defined and about
whether TBs of the two PDSCHs should be different will be
made later.

An enhanced HARQ process ID indication may be sup-
ported for DCI 0-2/1-2 and DCI 0-1/1-1 by one or more of
the following options. Meanwhile, '32' may be considered
as the maximum number of HARQ processes supported for
both UL and DL. Whether DCI 0-0/1-0 is supported will be
discussed later.

Supported option 1: Slot index as a most significant bit
(MSB)

Support option 2: Slot index as a least significant bit
(LSB)

Support option 3: Reuse of one bit of another bit field

Support option 4: Extension of a HARQ process ID field
up to 5 bits

HARQ codebook enhancement is supported as follows.

In the case of a Type-2 HARQ codebook, the size of the
HARQ-ACK codebook may be reduced by including only
HARQ-ACK of a PDSCH with a HARQ process for which
feedback is capable of being performed (codebook option 1).
Meanwhile, details of a counter downlink assignment index
(C-DAI) and a total DAI (T-DAI) for DCI of a PDSCH with
an enabled/disabled HARQ process (or at least DCI for SPS
release/SPS PDSCH) will be discussed later. Alternatively,
there may be no improvement to a Type-2 HARQ-ACK
codebook (codebook option 2). Alternatively, other code-
book options may be additionally defined or considered.

In the case of a Type-1 HARQ codebook, further discus-
sion may be required in a top-down selection manner from
among the following options. First, additional improvement
to the Type-1 HARQ-ACK codebook may not be performed
(option 1). Alternatively, NACK may be reported for a
disabled process (option 2). Alternatively, reducing the size
of the type-1 HARQ-ACK codebook may be considered
according to criterion (option 3). Meanwhile, improvement
of a Type-3 HARQ-ACK codebook will be discussed later.

Hereinafter, in relation to the above-described scenarios,
an operation of a UE/BS when HARQ feedback is disabled
in activation/release of an SPS PDSCH will be described.

Figure 12:
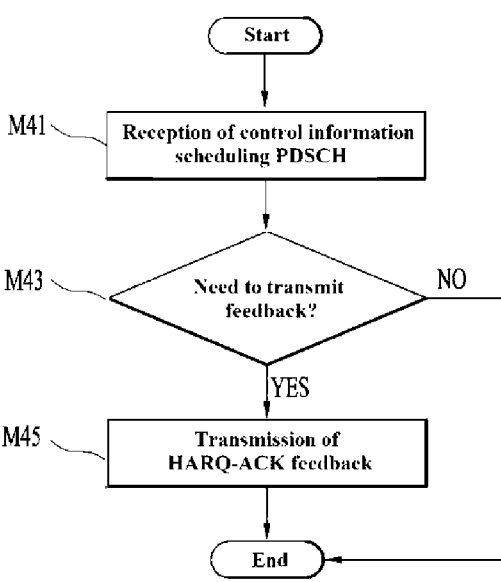
FIG. 12 is a diagram illustrating a method in which a UE transmits a feedback signal based on received control information

FIG. 12 is a diagram illustrating a method in which a UE
transmits a feedback signal based on received control infor-
mation.

Referring to FIG. 12, the UE may receive control infor-
mation for scheduling a PDSCH from a BS (M41). Here, the
PDSCH scheduled through the control information may be
an SPS PDSCH. As described above, the SPS PDSCH has
been introduced for the purpose of significantly reducing
overhead of a control channel.

Next, the UE may determine whether to transmit a feed-
back signal, which is HARQ feedback for the control
information, based on whether a HARQ process for the
PDSCH is enabled/disabled (M43). Specifically, when exist-
ing HARQ feedback is enabled, the UE may transmit
information about whether activation of the SPS PDSCH is
received through HARQ feedback for the SPS PDSCH
corresponding to a HARQ process ID (corresponding to
activation) (M45). In relation to activation/release of the
SPS PDSCH, HARQ-ACK feedback in NR may be used to indicate whether the UE has correctly received an SPS
PDSCH activation/release command.

However, when HARQ feedback is disabled, since the
feedback signal for the SPS PDSCH is not transmitted, the
BS (or gNB) is not aware of whether the UE has successfully
received information about activation of the SPS PDSCH. In
this case, the BS (or gNB) may continuously transmit the
SPS PDSCH according to scheduling of the SPS PDSCH in
a situation in which the UE does not recognize activation of
the SPS PDSCH. Due to this ambiguity, the BS may
redundantly reserve a DL resource and/or damage to a DL
buffer may occur. Accordingly, there is a need to resolve this
ambiguity, and methods for resolving the ambiguity will be
described in detail below.

(1) Proposal 1

When feedback of one HARQ process ID is disabled,
feedback for activation of the SPS PDSCH may be defined
as follows.

1) When a HARQ ID of a first transmitted PDSCH after
DCI for SPS activation (or SPS activation DCI) is received
is a HARQ-enabled ID, the UE may transmit ACK/NACK
feedback according to decoding of the first PDSCH. In other
words, when the HARQ ID of the first transmitted PDSCH
is a HARQ-enabled ID, the UE may respond to SPS acti-
vation by transmitting ACK/NACK feedback according to
decoding of the first PDSCH.

2) When the HARQ ID of the first transmitted PDSCH
after the DCI for SPS activation is received is a HARQ-
disabled ID, information related to SPS activation may be
provided according to Option 1 and/or Option 2 as follows.

① Option 1: ACK or NACK feedback is transmitted
according to decoding of the first PDSCH. In this case,
ACK/NACK bits may be transmitted through a PUCCH
resource indicated by a PUCCH resource indicator (PRI)
field in the SPS activation DCI. In other words, if the DCI
is related to SPS activation, even when the HARQ process
is disabled, the UE may transmit the feedback signal related
to reception of SPS activation by transmitting ACK/NACK
for the decoding result of the first PDSCH.

② Option 2: ACK feedback indicating that the SPS
activation DCI itself has been received may be transmitted.
In this case, ACK/NACK bits may be transmitted through
the PUCCH resource indicated by the PRI field in the
activation DCI.

Here, Option 1 may mean that a result of performing
decoding of the first PDSCH after SPS activation DCI is
received is fed back as ACK or NACK even for a disabled
HARQ process as an exceptional case unlike the case in
which the existing HARQ feedback is enabled. In addition,
Option 2 may indicate that ACK is transmitted as a meaning
that the SPS activation DCI itself has successfully been
received without decoding the first PDSCH after the SPS
activation DCI is received.

As such, even in an NTN communication situation in
which there is a high possibility that HARQ-disabled will be
configured, ambiguity between the UE and the BS regarding
whether an indication of SPS activation has been received
may be resolved and, therefore, waste of a DL resource and
a buffer may be minimized.

(2) Proposal 2

In a current specific scenario (e.g., NR), the HARQ-ACK
codebook/feedback related to SPS activation has a structure
in which 1) a PDSCH transmitted first after SPS activation
DCI is received is regarded as a dynamic PDSCH such that
a corresponding HARQ-ACK feedback transmission
resource is allocated as a PUCCH resource indicated by the
DCI, and 2) PDSCHs transmitted after the first PDSCH of "1)" is received are regarded as SPS PDSCHs such that a corresponding HARQ-ACK feedback transmission resource is allocated as a PUCCH resource configured through RRC.

Reception related to determination of a HARQ process ID of the specific scenario (e.g., TS 38.321) may be defined as shown in Table 15 below.

(3) Proposal 3

Alternatively, even when HARQ feedback is disabled, the UE may transmit ACK indicating that release of an SPS PDSCH has correctly been received to the BS using a PUCCH resource in DCI indicating release of the SPS PDSCH.

TABLE 15

For configured downlink assignments without harq-ProcID-Offset, the HARQ Process ID associated with the slot where the DL transmission starts is derived from the following equation:

HARQ Process ID = [floor (CURRENT_slot × 10/(numberOfSlotsPerFrame × periodicity))] modulo nrofHARQ-Processes where CURRENT_slot = [(SFN × numberOfSlotsPerFrame) + slot number in the frame] and numberOfSlotsPerFrame refers to the number of consecutive slots per frame as specified in TS 38.211 [8].

NOTE 1: In case of unaligned SFN across carriers in a cell group, the SFN of the concerned Serving Cell is used to calculate the HARQ Process ID used for configured downlink assignments.

For configured downlink assignments with harq-ProcID-Offset, the HARQ Process ID associated with the slot where the DL transmission starts is derived from the following equation:

HARQ Process ID = [floor (CURRENT_slot × 10/(numberOfSlotsPerFrame × periodicity))] modulo nrofHARQ-Processes + harq-ProcID-Offset where CURRENT_slot = [(SFN × numberOfSlotsPerFrame) + slot number in the frame] and numberOfSlotsPerFrame refers to the number of consecutive slots per frame as specified in TS 38.211 [8].

NOTE 2: CURRENT_slot refers to the slot index of the first transmission occasion of a bundle of configured downlink assignment.

Alternatively, the UE may expect that the BS will configure/allocate only an enabled HARQ process ID for an SPS PDSCH. In this way, a method of allocating only the enabled HARQ process ID is considered as follows.

1) Multiple SPSs (or multiple SRS configurations) may be configured in which a specific SPS configuration is configured only with an enabled HARQ process (or an enable HARQ process ID) and the remaining SPS configurations are configured with a disabled HARQ process (or a disabled HARQ process ID) or an enabled and/or disabled process.

2) HARQ ID pools may be configured in an SPS configuration. One pool (e.g., pool ID=0) may be configured only with an enabled ID (or a enabled ID for HARQ-enabled process), and the other pool (e.g., pool ID=1) may be configured with a disabled ID (a enabled ID for HARQ-enabled process) or only with an enabled ID and a disabled ID.

3) Alternatively, the BS (or gNB) may configure/indicate only the enabled HARQ process ID through a MAC equation (HARQ ID determination equation, see Table 15).

For example, ① When there are 10 HARQ process IDs, enabled IDs={0, 2, 4, 6, 8} and disabled IDs={1, 3, 5, 7, 9} may be configured. When the SPS PDSCH is configured/indicated to be allocated only with the enabled or disabled IDs, the MAC equation may be one of 5 logical values of {0, 2, 4, 6, 8} or one of 5 logical values of {1, 3, 5, 7, 9}. Considering this, the BS may adjust "CURRENT_slot" to configure/indicate only an enabled process in the MAC equation (or HARQ ID determination equation). Alternatively, ② Enabled IDs={0, 1, 2, 3, 4, 5} and disabled IDs={6, 7, 8, 9} may be configured (case in which IDs are consecutively configured). In this case, nrofHARQ-processes=6 and harq-ProcID-Offset=0 may be configured in the MAC equation such that an SPS HARQ ID (or HARQ process ID) is allocated only with the enabled IDs. Alternatively, when the SPS HARQ ID is allocated only with the disabled IDs, nrofHARQ-processes=4 and harq-ProcID-Offset=6 may be configured in the MAC equation.

In this case, the aforementioned ambiguity may be resolved by ensuring an enabled HARQ process for a procedure related to the SPS PDSCH in an NTN communication situation in which HARQ is highly likely to be configured to be disabled.

Specifically, in the case of a disabled HARQ process, since there is no HARQ feedback, the BS is not aware of information about whether the UE has correctly received an indication of release of the SPS PDSCH. In this case, since the BS is incapable of predicting an operation of the UE, errors may continue to occur. To solve this problem, the UE may feed back information related to successful reception of release of the SPS PDSCH for both enabled/disabled HARQ process IDs to the BS using a PUCCH resource in the DCI indicating release of the SPS PDSCH.

In this case, similar to Proposal 1, even when there is a high possibility that HARQ-disabled will be configured in the NTN communication situation, ambiguity related to reception of an indication of the SPS PDSCH may be effectively resolved by ensuring transmission of a feedback signal for release of the SPS PDSCH.

(4) Proposal 4

Alternatively, for all disabled HARQ IDs, an ACK/NACK feedback resource (e.g., a PUCCH resource) may be configured/indicated through RRC. In this case, in the SPS PDSCH (especially for all HARQ process IDs in which HARQ is disabled), the ACK/NACK resource may be commonly configured through RRC, and the UE may use the ACK/NACK resource when transmission of feedback information about activation/release is needed. When ACK/NACK information is required in a disabled SPS PDSCH, examples of the above proposals 1, 2, and 3 may be considered. Meanwhile, the periodicity of the ACK/NACK resource may be configured to be longer than that of the SPS PDSCH.

In addition, the UE may not expect that a certain number N or more of DCIs indicating activation/release will be received in a certain time window (e.g., a bundling window) based on the periodicity and size of the ACK/NACK resource configured through RRC. Here, the N value may be configured by the BS or determined by capabilities of the UE. For example, when more than N DCIs are received, processing may be performed according to priority considering some or all of the following rules.

1) N DCIs may be selected in order of increasing or decreasing HARQ ID number (e.g., corresponding to the first PDSCH) scheduled by excessively received DCI. Additionally or alternatively, 2) the most recent N DCIs may be preferentially selected based on the timing of the ACK/NACK resource. Additionally or alternatively, 3) N DCIs may be selected in order of the lowest/highest CCE index/slot index associated with activation DCI. Additionally or alternatively, 4) the BS may directly signal priority or configure and/or indicate a predefined priority rule.

In this case, the UE may be guaranteed to transmit a feedback signal using a resource configured through RRC even for an SPS PDSCH for which HARQ-disabled is configured, and ambiguity related to whether an indication of activation/release of the SPS PDSCH is received may be effectively resolved.

Examples of the above-described proposed methods may also be included as one of implementation methods of the present disclosure and, therefore, it is obvious that the examples are regarded as the proposed methods. In addition, although the above-described proposed methods may be independently implemented, the proposed methods may be implemented in the form of a combination (or integration) of some of the proposed methods. A rule may be defined such that a BS informs a UE of information as to whether to apply the proposed methods (or information about rules of the proposed methods) through a predefined signal (e.g., a physical layer signal or a higher layer signal). A higher layer may include, for example, one or more of functional layers such as a media access control (MAC) layer, a radio link control (RLC) layer, a packet data convergence protocol (PDCP) layer, an RRC layer, and a service data adaptation protocol (SDAP) layer.

The methods, embodiments, or descriptions for implementing the method proposed in this disclosure may be applied separately or in combination of one or more methods (or embodiments or descriptions).

Figure 13:
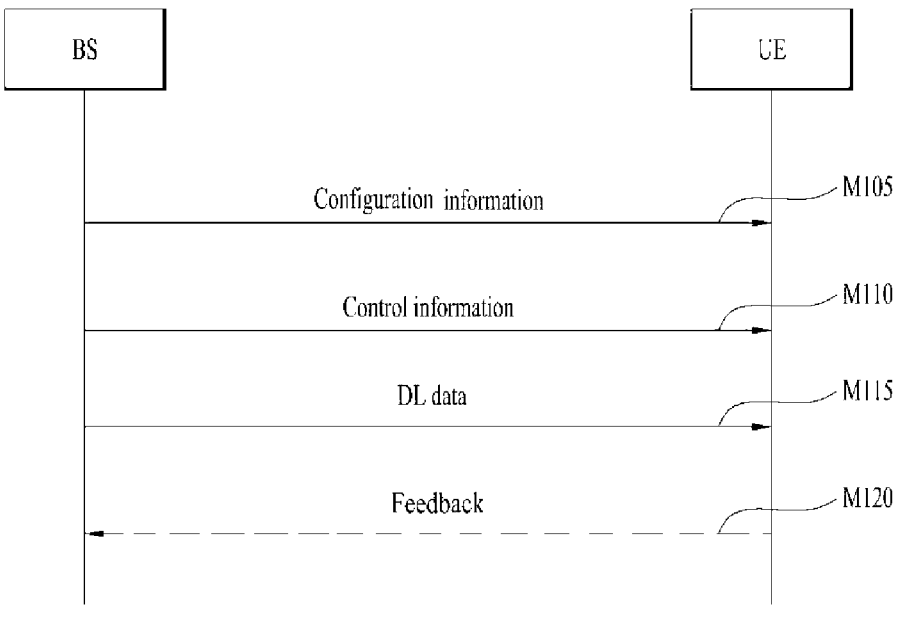
FIG. 13 is a flowchart illustrating a method of performing signaling between a BS and a UE based on the above-described embodiments.

FIG. 13 is a flowchart illustrating a method of performing signaling between a BS and a UE based on the above-described embodiments.

The BS and the UE may perform one DL and/or data/channel transmission/reception operation based on at least one of Proposal 1, Proposal 2, Proposal 3, or Proposal 4 described above.

Although not shown in FIG. 13, a default HARQ operation mode of the UE may be configured in an operation prior to RRC connection/configuration in relation to an NTN. For example, when an NTN cell (a cell accessed by the UE) is indicated through a PBCH (MIB) or an SIB, the UE may configure the default mode as HARQ-disabled. Alternatively, one of a HARQ-disabled configuration and a HARQ-enabled configuration may be indicated as the default HARQ operation mode through the PBCH (MIB) or the SIB (e.g., when the NTN cell is indicated).

Referring to FIG. 13, the BS may transmit configuration information to the UE (M105). That is, the UE may receive the configuration information from the BS. For example, the configuration information may include NTN-related configuration information/configuration information for DL transmission and reception (e.g., PDCCH-config or PDSCH-config), HARQ process-related configuration (e.g., whether HARQ feedback is enabled/disabled, the number of HARQ processes, etc.), CSI report-related configuration (e.g., CSI report configuration, CSI report quantity, or CSI-RS resource configuration). For example, the configuration information may be transmitted through higher layer (e.g., RRC or a MAC CE) signaling. Alternatively, whether HARQ feedback is enabled/disabled may be configured for each cell group. Alternatively, whether HARQ feedback is enabled/disabled may be configured through bitmap-type information. Alternatively, the configuration information may include SPS-related configuration (e.g., SPS-config). The SPS-related configuration may include information about whether HARQ feedback is enabled/disabled.

Alternatively, according to the above-described second indication method, the information about whether HARQ feedback is enabled/disabled may be transmitted through the SPS configuration.

Next, the BS may transmit control information to the UE (M110). That is, the UE may receive the control information from the BS. The control information may be transmitted/received through DCI. Alternatively, the control information may include scheduling information for DL data/DL channel transmission and reception, resource assignment information, information related to HARQ feedback (e.g., a new data indication, an RV, the number of HARQ processes, a DAI, a TPC command for a scheduled PUCCH, a PRI, and/or a PDSCH-to-HARQ_FEEDBACK timing indicator), an MCS, and/or frequency-domain resource assignment. Alternatively, the DCI may be one of DCI format 1_0 and DCI format 1_1.

Alternatively, as described in the above proposed methods (e.g., Proposal 1, Proposal 2, Proposal 3, and Proposal 4), the DCI may include configuration information about activation and/or release of the SPS PDSCH.

Alternatively, as described in the above first indication method, activation/deactivation of the SPS PDSCH may be indicated/configured based on the DCI. Alternatively, whether HARQ feedback is enabled/disabled may be configured through DCI different from the DCI related to activation/deactivation of the SPS PDSCH. Alternatively, the DCI related to activation/deactivation of the SPS PDSCH may include a field related to whether HARQ feedback is enabled/disabled.

Next, the BS may transmit DL data/DL channel (or a PDSCH) to the UE (M115). That is, the UE may receive the DL data/DL channel from the BS. The DL data/DL channel may be transmitted/received based on the above-described configuration information. Alternatively, the DL data/DL channel may be transmitted and received based on the above-described proposed method.

Next, the UE may determine whether to transmit a feedback signal based on a HARQ process configured for the DL data/channel (M120). In addition, when the DCI includes control information about activation/release of the SPS PDSCH, the UE may transmit the feedback signal for an indication of activation/release of the SPS PDSCH based on the above-described proposed methods (e.g., Proposal 1, Proposal 2, Proposal 3, and Proposal 4).

For example, when the DCI includes control information about whether the SPS PDSCH is activated/released, the UE may transmit a feedback signal for reception of activation/release of the SPS PDSCH regardless of whether a HARQ process for the SPS PDSCH is disabled. That is, when the DCI includes control information about whether the SPS PDSCH is activated/released, the UE may transmit the feedback signal for reception of an indication/configuration of whether the SPS PDSCH is activated/released even when the HARQ process for the SPS PDSCH is disabled. Alternatively, the UE may be configured only with a HARQ process ID (or a HARQ process pool ID) for which the HARQ process is enabled through the DCI or may determine a HARQ process ID for the SPS PDSCH based on at least one parameter received through RRC signaling.

The BS may generically refer to an object that performs transmission and reception of data with the UE. For example, the BS may be a concept including one or more transmission points (TPs) or one or more transmission and reception points (TRPs). In addition, the TP and/or the TRP may include a panel or a transmission/reception unit of the BS. In addition, "TRP" may be replaced with expressions such as panel, antenna array, cell (e.g., macro cell/small cell/pico cell), TP, and BS (gNB). As described above, the TRP may be distinguished according to information (e.g., an index or ID) about a CORESET group (or CORESET pool). As an example, when one UE is configured to perform transmission/reception with a plurality of TRPs (or cells), this may mean that a plurality of CORESET groups (or CORESET pools) is configured for one UE. Such a configuration for the CORESET group (or CORESET pool) may be performed through higher layer signaling (e.g., RRC signaling).

Figure 14:
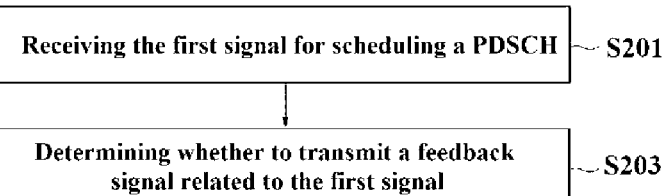
FIG. 14 is a diagram illustrating a method in which a UE transmits a feedback signal.

FIG. 14 is a diagram illustrating a method in which a UE transmits a feedback signal.

Referring to FIG. 14, the UE may receive a first signal for scheduling a PDSCH from the BS (S201). Here, the first signal may be DCI transmitted through a control channel such as a PDCCH. Alternatively, the first signal may further include control information indicating activation or release of an SPS PDSCH and may include scheduling information for the SPS PDSCH.

Next, the UE may determine whether to transmit a feedback signal related to the first signal (S203). The UE may receive a configuration or indication about whether a HARQ process for the PDSCH (or SPS PDSCH) is enabled or disabled through the DCI (or SPS configuration). The UE may determine whether to transmit the feedback signal for the first signal and/or the PDSCH based on the configured or indicated enabling or disabling of the HARQ process.

Although not shown in the flowchart, the UE may receive the PDSCH (or SPS PDSCH) scheduled by the first signal and transmit the feedback signal after receiving the PDSCH or before receiving the PDSCH.

Alternatively, when the DCI includes control information about whether the SPS PDSCH is activated/released, the UE may transmit a feedback signal for reception of activation/release of the SPS PDSCH regardless of whether the HARQ process for the SPS PDSCH is disabled. That is, when the DCI includes the control information about whether the SPS PDSCH is activated/released, the UE may transmit the feedback signal for reception of an indication/configuration of whether the SPS PDSCH is activated/released even when the HARQ process for the SPS PDSCH is disabled.

Specifically, when the DCI includes the control information about whether the SPS PDSCH is activated/released, the UE may transmit the feedback signal for reception of the control information even when the HARQ process for the SPS PDSCH is disabled. The feedback signal may be an ACK signal for reception of the first signal itself. In this case, the UE may transmit a feedback signal for reception of an indication/configuration of whether the SPS PDSCH is activated/released using a PUCCH resource indicated by a PRI field included in the DCI.

Alternatively, as described above in Proposal 4, when the HARQ process is disabled, the UE may receive a previously allocated feedback resource on which the feedback signal according to an indication of activation/release of the SPS PDSCH is to be transmitted through RRC signaling. In this case, the UE may transmit the feedback signal for reception of the indication of activation/release of the SPS PDSCH through the feedback resource. Here, the periodicity of the feedback resource may be configured to be longer than the periodicity of the SPS PDSCH.

In contrast, when the first signal (or DCI) does not include the information about activation/release of the SPS PDSCH, the UE transmits a feedback signal corresponding to a HARQ process for the PDSCH scheduled by the first signal (or DCI). That is, when the first signal (or DCI) does not include the information about activation/deactivation of the SPS PDSCH, the UE may not transmit the feedback signal for the PDSCH when the HARQ process for the PDSCH is disabled and may transmit the feedback signal for the PDSCH when the HARQ process for the PDSCH is enabled. That is, only when the first signal (or DCI) includes the information about activation/release of the SPS PDSCH, the UE may transmit the feedback signal regardless of whether the HARQ process for the PDSCH is enabled/disabled.

Alternatively, as in Proposal 2 described above, the UE may always transmit the feedback signal for activation/release of the SPS PDSCH as only an enabled HARQ process for the SPS PDSCH scheduled by the first signal is configured. Specifically, the UE may be configured only with the enabled HARQ process for the SPS PDSCH through an SPS configuration configuring only an enabled HARQ process for the SPS PDSCH among the multiple SPS configurations. Alternatively, the SPS configuration may configure at least two HARQ ID pools. Here, the at least two HARQ ID pools may include a first HARQ ID pool including only IDs for which the HARQ process is enabled and a second HARQ ID pool including IDs for which the HARQ process is enabled and/or disabled. In this case, the UE may receive an indication or configuration of HARQ process IDs only with IDs included in the first HARQ ID pool for the SPS PDSCH.

Alternatively, as described in Proposal 2, the UE may receive an indication or configuration for CURRENT_slot, nrofHARQ-Processes, and/or harq-ProcID-Offset to determine an enabled HARQ process ID for the SPS PDSCH. For example, the UE may receive an indication of the value of "CURRENT_slot" to determine the enabled HARQ process ID (e.g., through a slot index of the first PDSCH scheduled by the first signal). Alternatively, the UE may receive an indication for the value of "nrofHARQ-Processes" and/or "harq-ProcID-Offset" to determine only the enabled HARQ process ID for the SPS PDSCH.

Figure 15:
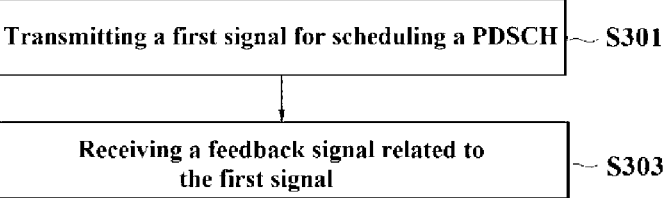
FIG. 15 is a diagram illustrating a method in which a BS receives a feedback signal.

FIG. 15 is a diagram illustrating a method in which a BS receives a feedback signal.

Referring to FIG. 15, the BS may transmit a first signal for scheduling a PDSCH to the UE (S301). Here, the first signal may be DCI transmitted through a control channel such as a PDCCH. Alternatively, the first signal may further include control information indicating activation or release of an SPS PDSCH and may include scheduling information for the SPS PDSCH.

Next, the BS may receive a feedback signal related to the first signal (S303). Specifically, the BS may receive a feedback signal for reception of activation/release of the SPS PDSCH regardless of whether a HARQ process for the SPS PDSCH is disabled when the first signal includes the control information about whether the SPS PDSCH is activated/released.

For example, when the first signal includes the control information about whether the SPS PDSCH is activated/released, the BS may receive a feedback signal for reception of an indication/configuration of whether the SPS PDSCH is activated/released even when a HARQ process for the SPS PDSCH is disabled. Here, the feedback signal may be an ACK/NACK signal for decoding of a PDSCH received first through scheduling of the first signal or an ACK signal for reception of the first signal, as described above in Proposal 1. In this case, the BS may receive the feedback signal for reception of an indication/configuration of whether the SPS PDSCH is activated/released using a PUCCH resource based on a PRI field included in the first signal.

Alternatively, as described above in Proposal 4, when the HARQ process is disabled, the BS may previously allocate a feedback resource on which the feedback signal according to an indication of activation/release of the SPS PDSCH is to be transmitted through RRC signaling. In this case, the BS may receive the feedback signal for reception of the indication of activation/release of the SPS PDSCH from the UE through the feedback resource. Here, the periodicity of the feedback resource may be configured to be longer than the periodicity of the SPS PDSCH.

In contrast, when the DCI does not include the information about activation/release of the SPS PDSCH, the UE transmits a feedback signal corresponding to a HARQ process for the PDSCH scheduled by the DCI. That is, when the DCI does not include the information about activation/deactivation of the SPS PDSCH, the UE may not transmit the feedback signal for the PDSCH when the HARQ process for the PDSCH is disabled and may transmit the feedback signal for the PDSCH when the HARQ process for the PDSCH is enabled. That is, only when the DCI includes the information about activation/release of the SPS PDSCH, the UE may transmit the feedback signal regardless of whether the HARQ process for the PDSCH is enabled/disabled.

Alternatively, as in Proposal 2 described above, the BS may always receive the feedback signal for activation/release of the SPS PDSCH by configuring only an enabled HARQ process for the SPS PDSCH for the UE. Specifically, the BS may configure, for the UE, only the enabled HARQ process for the SPS PDSCH through an SPS configuration configuring only the enabled HARQ process for the SPS PDSCH among the multiple SPS configurations. Alternatively, the SPS configuration may configure at least two HARQ ID pools. Here, the at least two HARQ ID pools may include a first HARQ ID pool including only IDs for which the HARQ process is enabled and a second HARQ ID pool including IDs for which the HARQ process is enabled and/or disabled. In this case, the BS may indicate or configure HARQ process IDs only with IDs included in the first HARQ ID pool for the SPS PDSCH.

Alternatively, as described in Proposal 2, the BS may adjust the value of "CURRENT_slot", nrofHARQ-Processes" and/or "harq-ProcID-Offset" in relation to the equations presented in Table 14 such that only an enabled HARQ process ID for the SPS PDSCH is determined. For example, the BS may indicate and/or configure "CURRENT_slot" to determine the enabled HARQ process ID by adjusting a slot index of a PDSCH scheduled through the first signal. Alternatively, the BS may determine the value of "nrof-HARQ-Processes" and/or "harq-ProcID-Offset" and indicate the value to the UE such that only the enabled HARQ process ID for the SPS PDSCH is determined.

As such, in an NTN communication environment in which the HARQ process is highly likely to be disabled, a feedback signal for reception of an indication of activation/release of the SPS PDSCH is guaranteed to be transmitted to the UE regardless of whether the HARQ process is disabled. Therefore, waste of a DL resource and a DL buffer due to ambiguity of whether the indication of activation/release is received may be minimized and latency in receiving a DL signal of the UE due to the ambiguity may be minimized. Communication System Example to which the Present Disclosure is Applied Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 16:
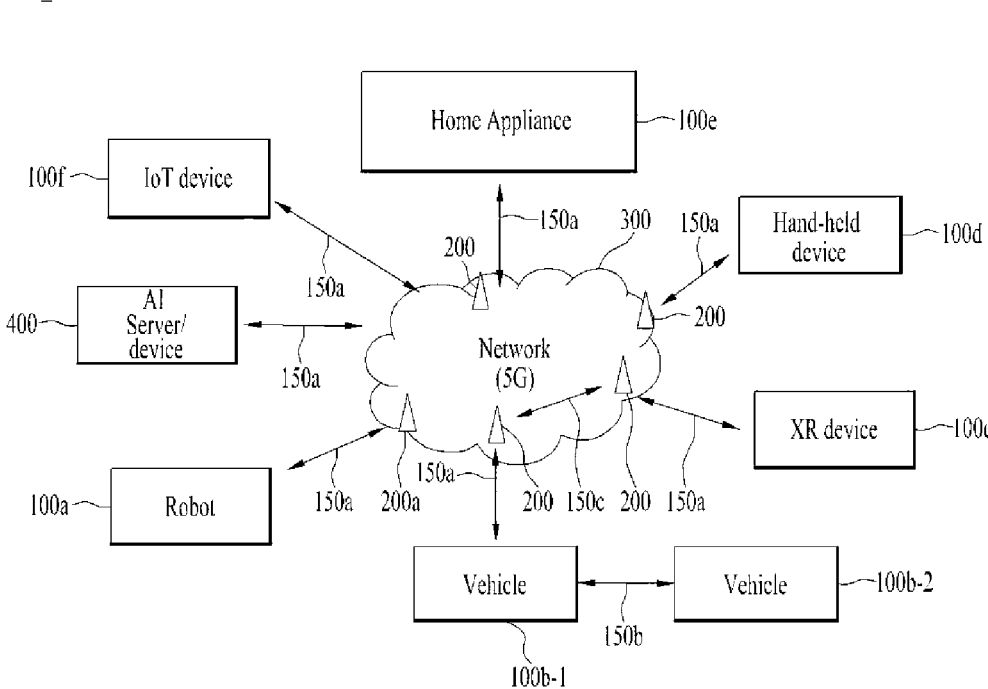
FIG. 16 illustrates a communication system applied to the present disclosure.

FIG. 16 illustrates a communication system applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 17:
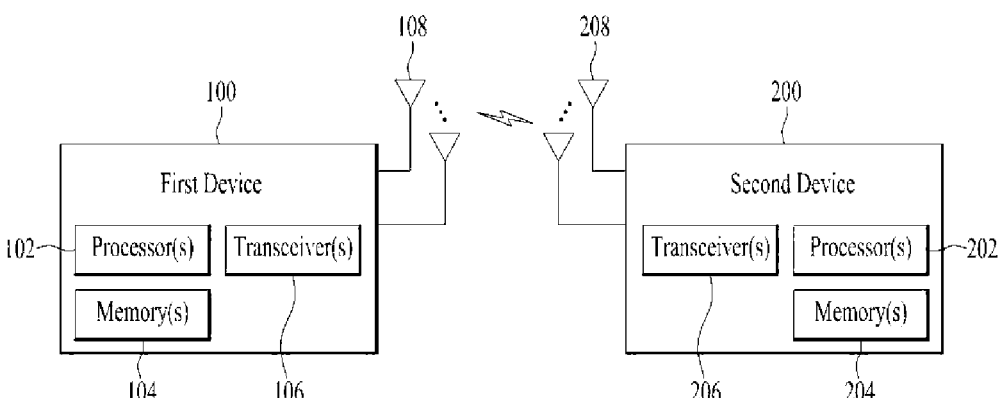
FIG. 17 illustrates wireless devices applicable to the present disclosure.

FIG. 17 illustrates a wireless device applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an embodiment, the first wireless device 100 or UE may include the processor(s) 102 and the memory(s) 104, connected to the RF transceiver(s). The memory(s) 104 may include at least one program capable of performing operations related to the embodiments described with reference to FIGS. 11 to 15.

Specifically, the processor(s) 102 may control the RF transceiver(s) 106 to receive a first signal for scheduling a PDSCH and determine whether to transmit a feedback signal related to the first signal based on a HARQ process for the PDSCH. The feedback signal may be transmitted regardless of whether the HARQ process for the PDSCH is disabled based on the first signal including control information about activation or release of an SPS PDSCH.

Alternatively, a chipset including the processor(s) 102 and the memory(s) 104 may be configured. The chipset may include at least one processor, and at least one memory operably connected to the at least one processor and causing, when executed, the at least one processor to perform operations. The operations may include receiving a first signal for scheduling a PDSCH and determining whether to transmit the feedback signal related to the first signal based on a HARQ process for the PDSCH. The feedback signal may be transmitted regardless of whether the HARQ process for the PDSCH is disabled based on the first signal including control information about activation or release of an SPS PDSCH. The at least one processor may perform operations for the embodiments described with reference to FIGS. 11 to 15 based on a program included in the memory(s).

Alternatively, a computer readable storage medium including at least one computer program that causes at least one processor to perform operations is provided. The operations may include receiving a first signal for scheduling a PDSCH and determining whether to transmit the feedback signal related to the first signal based on a HARQ process for the PDSCH. The feedback signal may be transmitted regardless of whether the HARQ process for the PDSCH is disabled based on the first signal including control information about activation or release of an SPS PDSCH. The computer program may include programs through which operations for the embodiments described with reference to FIGS. 11 to 15 may be performed.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to an embodiment, the BS or NTN may include the processor(s) 202, the memory(s) 204, and/or the transceiver(s) 206. The processor(s) 202 may control the transceiver(s) 206 or RF transceiver(s) to transmit a first signal for scheduling a PDSCH to a UE and receive a feedback signal related to the first signal. The feedback signal may be received regardless of whether a HARQ process for the PDSCH is disabled based on the first signal including control information about activation or release of an SPS PDSCH. The processor(s) 202 may perform the above-described operations based on the memory(s) 204 including at least one program capable of performing operations related to the embodiments described with reference to FIGS. 11 to 15.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
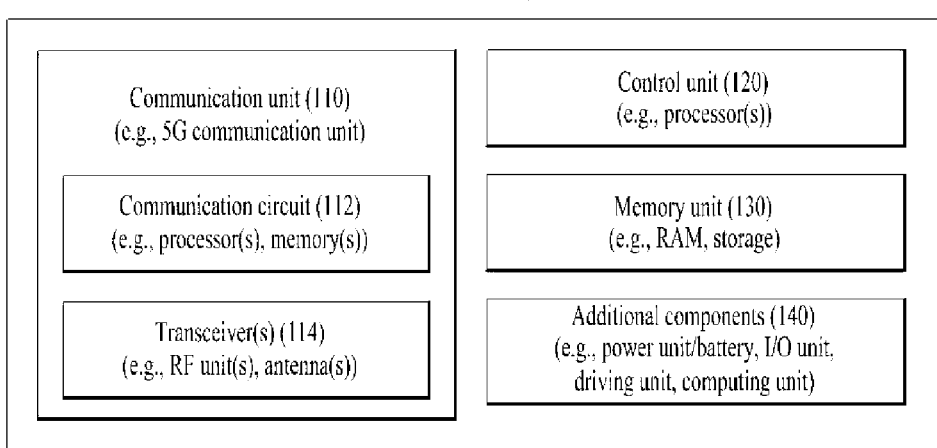
FIG. 18 illustrates another example of a wireless device to which the present disclosure is applied.

Examples of Application of Wireless Devices to which the Present Disclosure is Applied FIG. 18 illustrates another example of a wireless device applied to the present disclosure.

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method comprising:

receiving information for a semi-persistent scheduling physical downlink shared channel (SPS PDSCH) configuration;

receiving a physical downlink control channel (PDCCH) including downlink control information (DCI);

activating SPS PDSCH receptions related to the SPS PDSCH configuration based on the DCI; and transmitting an acknowledgement (ACK) or a negative ACK (NACK) for a first SPS PDSCH after the SPS PDSCH receptions are activated, regardless of a hybrid automatic repeat request (HARQ) feedback being disabled for a HARQ process identifier (ID) related to the first SPS PDSCH.

2. The method of claim 1, further comprising receiving a configuration of a feedback resource for a disabled HARQ process through radio resource control (RRC) signaling, wherein the ACK or the NACK is transmitted through the feedback resource.

3. The method of claim 2, wherein the feedback resource is configured to have a period longer than a period of the SPS PDSCH configuration.

4. The method of claim 1, wherein the SPS PDSCH configuration includes a first HARQ process ID pool including enabled HARQ process identifications (IDs) and a second HARQ process ID pool including disabled HARQ process IDs.

5. The method of claim 1, wherein the SPS PDSCH configuration is related to a non-terrestrial network (NTN).

6. A method comprising:

transmitting information for a semi-persistent scheduling physical downlink shared channel (SPS PDSCH) configuration to a user equipment (UE);

transmitting a physical downlink control channel (PDCCH) including downlink control information (DCI) related to an activation of SPS PDSCH receptions related to the SPS PDSCH configuration to the UE; and receiving, from the UE, an acknowledgement (ACK) or a negative ACK (NACK) for a first SPS PDSCH after the SPS PDSCH receptions are activated, regardless of a hybrid automatic repeat request (HARQ) feedback being disabled for a HARQ process identifier (ID) related to the first SPS PDSCH.

7. A user equipment (UE) comprising:

a radio frequency (RF) transceiver; and a processor connected to the RF transceiver, wherein the processor is configured to:

receive information for a semi-persistent scheduling physical downlink shared channel (SPS PDSCH);

receive a physical downlink control channel (PDCCH) including downlink control information (DCI);

activate SPS PDSCH receptions related to the SPS PDSCH configuration based on the DCI; and transmit an acknowledgement (ACK) or a negative ACK (NACK) for a first SPS PDSCH after the SPS PDSCH receptions are activated, regardless of a hybrid automatic repeat request (HARQ) feedback being disabled for a HARQ process identifier (ID) related to the first SPS PDSCH.

* * * * *